(12) United States Patent
Fowers et al.

(10) Patent No.: US 10,372,456 B2
(45) Date of Patent: Aug. 6, 2019

(54) TENSOR PROCESSOR INSTRUCTION SET ARCHITECTURE

(71) Applicant: Microsoft Technology Licensing, LLC, Redmond, WA (US)

(72) Inventors: Jeremy Halden Fowers, Seattle, WA (US); Kalin Ovtcharov, Issaquah, WA (US); Steven Karl Reinhardt, Vancouver, WA (US); Eric Sen Chung, Woodinville, WA (US); Ming Gang Liu, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 98 days.

(21) Appl. No.: 15/604,301

(22) Filed: May 24, 2017

(65) Prior Publication Data
US 2018/0341484 A1     Nov. 29, 2018

(51) Int. Cl.
*G06F 9/30* (2018.01)
*G06F 9/38* (2018.01)
(Continued)

(52) U.S. Cl.
CPC .......... *G06F 9/3016* (2013.01); *G06F 9/3012* (2013.01); *G06F 9/30036* (2013.01); *G06F 9/30076* (2013.01); *G06F 9/30098* (2013.01); *G06F 9/30123* (2013.01); *G06F 9/30163* (2013.01); *G06F 9/3828* (2013.01); *G06F 9/3836* (2013.01); *G06F 9/3893* (2013.01); *G06F 17/16* (2013.01); *G06N 3/063* (2013.01)

(58) Field of Classification Search
None
See application file for complete search history.

(56) References Cited

U.S. PATENT DOCUMENTS

| 5,613,044 A | 3/1997 | Pechanek et al. |
| 6,192,384 B1 | 2/2001 | Dally et al. |
| (Continued) | | |

FOREIGN PATENT DOCUMENTS

| CN | 101527010 A | 9/2009 |
| CN | 105488565 A | 4/2016 |
| (Continued) | | |

OTHER PUBLICATIONS

Liu, et al., "FPGA-based Acceleration of Deep Neural Networks Using High Level Method", In Proceedings of 10th International Conference on P2P, Parallel, Grid, Cloud and Internet Computing, Published on: Nov. 4, 2015, pp. 824-827.
(Continued)

*Primary Examiner* — Eric Coleman
(74) *Attorney, Agent, or Firm* — The Watson I.P. Group, PLC; Vladan M. Vasiljevic

(57) ABSTRACT

A hardware accelerator having an efficient instruction set is disclosed. An apparatus may comprise logic configured to access a first and a second machine instruction. The second machine instruction may be missing a tensor operand needed to execute the second machine instruction. The logic may be further configured to execute the first machine instruction, resulting in a tensor. The logic may be further configured to execute the second machine instruction using the resultant tensor as the missing tensor operand.

20 Claims, 11 Drawing Sheets

(51) Int. Cl.
*G06F 17/16* (2006.01)
*G06N 3/063* (2006.01)

(56) References Cited

U.S. PATENT DOCUMENTS

| | | | |
|---|---|---|---|
| 6,507,835 B1* | 1/2003 | Amundsen | G06F 17/30469 |
| 7,877,582 B2 | 1/2011 | Gshwind et al. | |
| 7,882,335 B2 | 2/2011 | Luick | |
| 8,131,659 B2 | 3/2012 | Xu et al. | |
| 8,190,860 B2 | 5/2012 | Moyer et al. | |
| 9,460,048 B2 | 10/2016 | Pechanek | |
| 10,073,816 B1* | 9/2018 | Lu | G06F 17/16 |
| 2003/0154364 A1 | 8/2003 | Peng et al. | |
| 2004/0139299 A1 | 7/2004 | Busaba et al. | |
| 2004/0139300 A1 | 7/2004 | Busaba et al. | |
| 2005/0086245 A1* | 4/2005 | Bennett | G06F 17/30477 |
| 2006/0150161 A1* | 7/2006 | Onder | G06F 8/445 717/127 |
| 2010/0115233 A1 | 5/2010 | Brewer et al. | |
| 2010/0257339 A1* | 10/2010 | Brown | G06F 9/3838 712/214 |
| 2011/0153991 A1* | 6/2011 | Busaba | G06F 9/3001 712/214 |
| 2013/0091340 A1* | 4/2013 | Abdallah | G06F 9/30189 712/20 |
| 2013/0103932 A1 | 4/2013 | Gshwind et al. | |
| 2014/0189291 A1* | 7/2014 | Yang | G06F 9/30036 712/7 |
| 2015/0220346 A1* | 8/2015 | Wang | G06F 9/3826 712/208 |
| 2015/0371132 A1 | 12/2015 | Gemello et al. | |
| 2016/0379109 A1 | 12/2016 | Chung et al. | |
| 2016/0379115 A1 | 12/2016 | Burger et al. | |
| 2017/0011288 A1 | 1/2017 | Brothers et al. | |
| 2017/0061279 A1* | 3/2017 | Yang | G06N 3/084 |

FOREIGN PATENT DOCUMENTS

| | | |
|---|---|---|
| EP | 0594240 B1 | 4/1994 |
| WO | 2016199154 A1 | 12/2016 |

OTHER PUBLICATIONS

Chen, et al., "Eyeriss: An Energy-Efficient Reconfigurable Accelerator for Deep Convolutional Neural Networks", In IEEE Journal of Solid-State Circuits, vol. 52, Issue 1, Published on: Nov. 8, 2016, pp. 1-12.

"Project FDNN: FPGA-based Deep Neural Networks", https://www.microsoft.com/en-us/research/project/project-fdnn-fpga-based-deep-neural-networks/, Published on: Feb. 1, 2015, 2 pages.

Merritt, Rick, "Google Designing AI Processors", http://www.eetimes.com/document.asp?doc_id=1329715, Published on: May 18, 2016, 5 pages.

Zhang, et al., "Optimizing FPGA-based Accelerator Design for Deep Convolutional Neural Networks", In Proceedings of the ACM/SIGDA International Symposium on Field-Programmable Gate Arrays, Published on: Feb. 22, 2015, 10 pages.

Ming, et al., "Recurrent Neural Networks Hardware Implementation on FPGA", In International Journal of Advanced Research in Electrical, Electronics and Instrumentation Engineering, vol. 5, Issue 1, Published on: Jan. 2016, pp. 401-409.

Qiu, Jiantao, et al., "Going Deeper with Embedded FPGA Platform for Convolutional Neural Network," FPGA '16, Feb. 21-23, 2016, 10 pages.

Ovtcharov, et al., "Accelerating Deep Convolutional Neural Networks Using Specialized Hardware", In Journal of Microsoft Research Whitepaper, vol. 2, No. 11, Feb. 22, 2015, pp. 1-4.

Qiao, et al., "FPGA-accelerated deep convolutional neural networks for high throughput and energy efficiency", In Publication of John Wiley & Sons, Jan. 1, 2016, 20 pages.

Andal, et al., "FPGA Modeling of Neuron for Future Artificial Intelligence Applications", In International Journal of Computational Engineering Research, vol. 03, Issue 07, Jul. 2013, pp. 40-46.

Rojas, Raul, "Hardware for Neural Networks", In Publication of Springer, 1996, pp. 451-477.

"International Search Report and Written Opinion Issued in PCT Application No. PCT/US2018/028970", dated Aug. 1, 2018, 15 Pages.

* cited by examiner

TENSOR PROCESSOR INSTRUCTION SET ARCHITECTURE

BACKGROUND

Computing is increasingly requiring extremely powerful processors. For example, machine learning such as, but not limited to, deep neural networks, requires a processor capable of performing an extremely high number of operations per second. Executing machine learning such as, but not limited to, deep neural networks, on a general-purpose central processing unit (CPU) can be extremely expensive.

Hardware accelerators have been used to supplement the processing performed on general-purpose CPUs.

SUMMARY

Certain embodiments described herein relate to a hardware accelerator having an efficient instruction set. In one embodiment, an apparatus comprises logic configured to: access a first and a second machine instruction in a set of machine instructions. The second machine instruction is missing a tensor operand needed to execute the second machine instruction. The logic is further configured to execute the first machine instruction, resulting in a tensor. The logic is further configured to execute the second machine instruction using the resultant tensor as the missing tensor operand.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
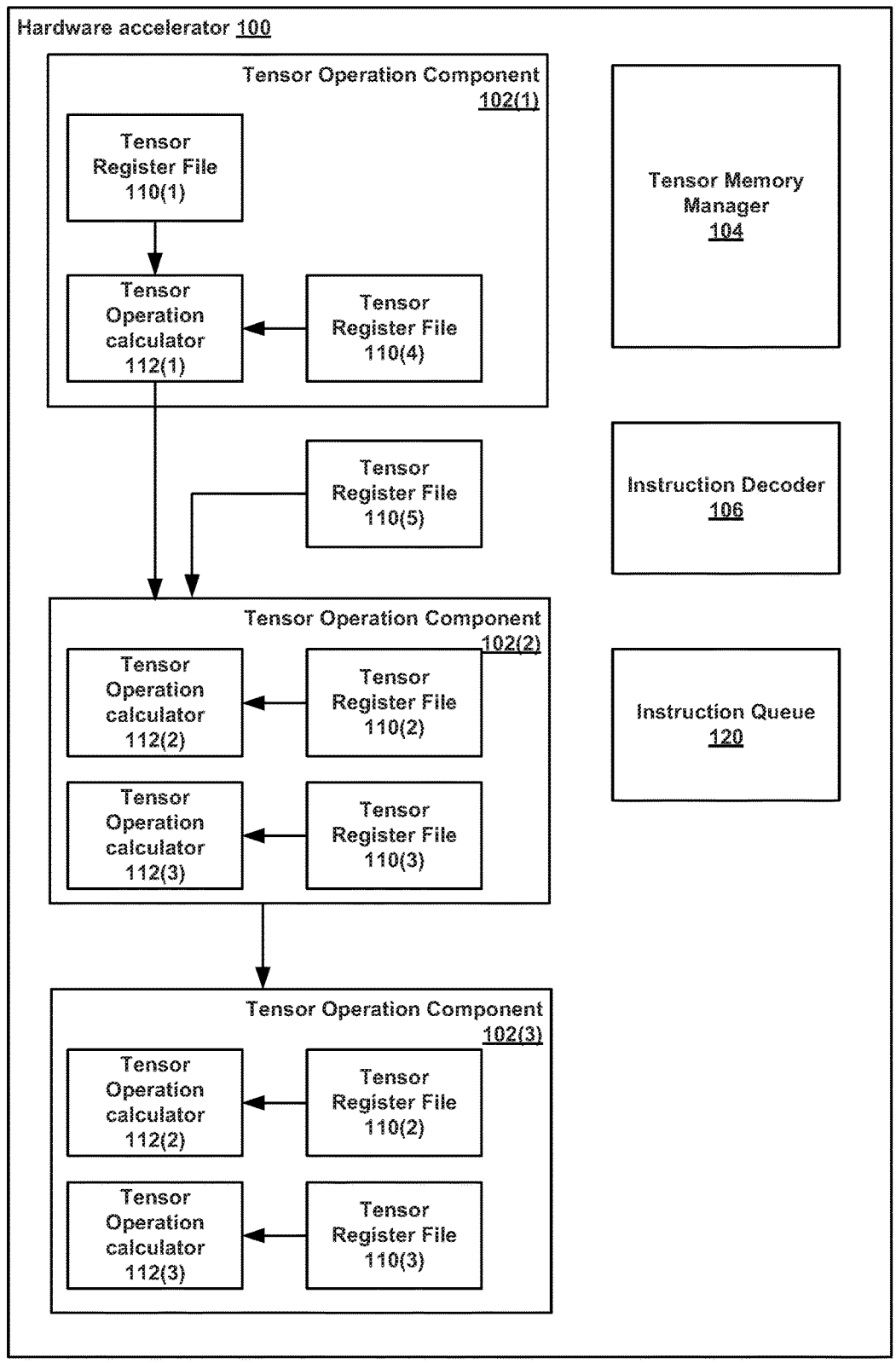
FIG. 1 depicts one embodiment of a hardware accelerator.

Certain embodiments of the present technology relate to hardware accelerators. Some embodiments relate to tensor register files in a hardware accelerator. Some embodiments of the present technology relate to an instruction set architecture in a hardware accelerator.

A hardware accelerator may have various tensor operation calculators to perform various types of tensor operations. The tensor operation calculators may need tensors to operate on. If a tensor operation calculator has to wait for the needed tensor to be provided, computing efficiently may be significantly slowed.

In some embodiments, rather than having a large tensor register file that stores tensors for all types of tensor operations, a hardware accelerator has multiple smaller tensor register files. These smaller tensor register files may be dedicated to one instance of a tensor operation calculator. Such a configuration may improve bandwidth by keeping the various tensor operation calculators busy a high percentage of the time. For example, having the dedicated tensor register files may avoid or at least reduce stalls that could otherwise occur while a tensor operation calculator waits for a tensor to be provided from storage. Also, having multiple smaller tensor register files may reduce cost versus having a larger centralized tensor register file that is multi-ported to allow simultaneous access to different tensor operation calculators.

A hardware accelerator may receive machine instructions in order to implement, for example, a machine learning algorithm. For example, the hardware accelerator could receive machine instructions to cause the hardware accelerator to implement a deep neural network. It can take an extreme amount of memory to represent a machine learning algorithm, such as a deep neural network. Decoding the machine instructions could potentially become a bottleneck, thereby reducing efficiency.

In some embodiments, the number of bits in a machine instruction used in a hardware accelerator is reduced to provide for efficient computing. This can provide a substantial memory savings. This can also save time in decoding the machine instructions. In some embodiments, advantage is taken of the observation that a tensor that results from execution of one machine instruction is frequently used as an input tensor to the next machine instruction.

One embodiment of a hardware accelerator has an instruction set in which some machine instructions are missing a tensor operand needed to execute the machine instruction. Therefore, the machine instruction takes fewer bits to encode. The hardware accelerator may execute a first machine instruction, resulting in a tensor. The hardware accelerator may execute a second machine instruction using the resultant tensor as a missing tensor operand in the second machine instruction. Thus, the hardware accelerator may take advantage of an observation that a tensor that results from execution of one machine instruction may frequently be used as an input tensor to another machine instruction.

Also, using the results of the first machine instruction for a tensor operand in the second machine instruction obviates the need to store the results of the first machine instruction in a register file in the hardware accelerator (or other storage such as memory external to the hardware accelerator), as well as reading the results back out from the storage in a separate machine instruction. Thus, hardware resources may be saved and latency between machine instructions may be reduced.

FIG. 1 depicts one embodiment of a hardware accelerator 100. The hardware accelerator 100 may also be referred to herein as a tensor processor. The hardware accelerator 100 may be implemented in a field programmable gate array (FPGA), application specific circuit (ASIC), application specific standard product (ASSP), system on a chip (SoC), complex programmable logic device (CPLD), but is not limited thereto. The term "hardware" accelerator broadly encompasses different ways of leveraging a hardware device to perform a function, including, for instance, at least: a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, and so on, or any combination thereof.

The hardware accelerator 100 includes several tensor operation components 102(1)-102(3), a tensor memory manager 104, an instruction queue 120, and an instruction decoder 106. The instruction queue 120 may receive machine instructions from outside the hardware accelerator 100 to be performed by the hardware accelerator 100. In one embodiment, the hardware accelerator 100 resides in an environment such as environment 1300 in FIG. 13. In that environment, the hardware accelerator 100 could receive machine instructions over bus 1314. For example, processor(s) 1306 could send machine instructions to the hardware accelerator 100.

The instruction decoder 106 may be configured to decode the machine instructions and to send control signals to other elements in the hardware accelerator 100 in order to execute the machine instructions. In some embodiments, the control signals are referred to as sub-component commands.

The tensor memory manager 104 may receive tensors to be used by the hardware accelerator 100 when executing the machine instructions. The tensors may originate from memory that is external to the hardware accelerator 100. For example, with reference to FIG. 13, the tensors may originate from memory 1312. The tensor memory manager 104 may also store tensors to memory external to the hardware accelerator 100, such as memory 1312.

Herein, a tensor includes, but is not limited to, vectors and matrices. A vector, as defined herein, is comprised of an ordered collection of "v" elements, where "v" is an integer greater than one. A matrix, as defined herein, is comprised of an array of "n×m" elements, where "n" and "m" are each integers greater than one. The matrix could be a square matrix (in which case n=m), but is not required to be a square matrix. A vector may correspond to either a row or a column of a matrix, in some cases. For example, the value of "v" for a given vector could be equal to "n" and/or to "m". However, the value of "v" is not required to be equal to either "n" or "m" (in which case the vector may be used for other than a matrix-vector operation). Note that it is not required that the value of "v" be the same for all vectors stored and operated on by the hardware accelerator 100. Likewise, it is not required that the values of "n" and "m" be the same for all matrices stored and operated on by the hardware accelerator 100. The tensor elements are scalar values, in some embodiments. It will be understood that the term "tensor", as used herein, does not require the tensors to obey any transformation rules.

The tensor operation components 102(1)-102(3) each may be configured to perform one or more types of tensor operations. Thus, each tensor operation component 102 may be configured to perform a set of one or more types of tensor operations. A tensor operation may involve one or more tensors. For example, some tensor operations involve a single tensor, some involve two tensors. In some embodiments, a tensor operation involves three or more tensors. Examples of the types of tensor operations involving two tensors include, but are not limited to, matrix-matrix multiply, matrix-vector multiply, matrix inversion, vector-vector multiply, vector-vector addition, and vector-vector subtraction. Note that for some of these tensor operations, there may be more than one technique. For example, vector-vector multiply could be a dot product or a cross product.

To perform the various types of tensor operations, the tensor operation components 102 have various tensor operation calculators 112. Tensor operation component 102(1) has tensor operation calculator 112(1). Tensor operation components 102(2) and 102(3) each have an instance of tensor operation calculator 112(2), as well as an instance of tensor operation calculator 112(3). Tensor operation calculator 112(1) performs some type of tensor operation, such as matrix-vector multiply. Tensor operation calculator 112(2) performs another type of tensor operation, such as vector-vector multiply. Tensor operation calculator 112(3) performs still another type of tensor operation, such as vector-vector addition. Note that some tensor operation calculators 112 could perform more than one type of tensor operation. For example, tensor operation calculator 112(3) could also perform as vector-vector subtraction. There may be other tensor operation calculators 112 that perform other types of tensor operations.

Three tensor operation components 102 are depicted, but there may be more or fewer than three tensor operation components 102. In some cases, two or more of the tensor operation components 102 may be configured to perform the same set of tensor operations. In the example of FIG. 1, tensor operation component 102(2) and 102(3) are each able to perform the same set of tensor operations. However, it is not required to have more than one tensor operation component 102 that is able to perform the same set of tensor operations.

In some embodiments, rather than having a large tensor register file that stores tensors for all types of tensor operations, the hardware accelerator 100 has multiple smaller tensor register files 110, at least some of which are used to store tensors for a specific type of tensor operation. These smaller tensor register files 110 may be dedicated to one instance of a tensor operation calculator 112. Such a configuration may reduce cost versus having a larger centralized tensor register file that is multi-ported to allow simultaneous access to different tensor operation calculators 112. Also, this configuration may improve bandwidth by keeping the various tensor operation calculators 112 busy a higher percentage of the time. For example, having the dedicated tensor register files 110 may avoid or at least reduce stalls that could otherwise occur while a tensor operation calculator 112 waits for a tensor to be provided from storage.

The hardware accelerator 100 includes a number of tensor register files 110(1)-110(5). The tensor register files 110 are used to store tensors for inputs to the tensor operation calculators 112. In one embodiment, at least some of the tensor register files (e.g., 110(1)-110(4) are dedicated to a particular type of tensor operation calculator 112. Note that it is possible for one or more tensor register files (e.g., 110(5)) to not be dedicated to a particular type of tensor operation calculator 112. Thus, at least some of the tensor register files 110 may be dedicated to a certain set of one or more tensor operations. For example, tensor register file 110(1) may be used to store tensors to be input to tensor operation calculator 112(1). Likewise, tensor register file 110(4) may be used to store tensors to be input to tensor operation calculator 112(1). In one embodiment, whenever the tensor memory manager 104 receives a tensor that is to be used in a type of tensor operation that is performed by tensor operation calculator 112(1), that tensor may be stored in tensor register file 110(1) or 110(4).

In the example of FIG. 1, tensor register file 110(2) may be used to store tensors to be input to tensor operation calculator 112(2). Note that there are two instances of tensor register file 110(2) and two instances of tensor operation calculator 112(2). Each instance of tensor operation calculator 112(2) has its own dedicated tensor register file 110(2), in one embodiment. In one embodiment, whenever the tensor memory manager 104 receives a tensor that is to be used in the type of tensor operation that is performed by tensor operation calculator 112(2), that tensor is stored in all instances of tensor register file 110(2). Note that a tensor operation calculator 112 may have zero, one, two, or more dedicated tensor register files 110.

In the example of FIG. 1, tensor register file 110(3) may be used to store tensors to be input to tensor operation calculator 112(3). Note that there are two instances of tensor register file 110(3) and two instances of tensor operation calculator 112(3). Each instance of tensor operation calculator 112(3) has its own dedicated tensor register file 110(3), in one embodiment. In one embodiment, whenever the tensor memory manager 104 receives a tensor that is to be used in the type of tensor operation that is performed by tensor operation calculator 112(3), that tensor is stored in all instances of tensor register file 110(3).

Tensor register file 110(5) is not necessarily dedicated to one of the tensor operation calculators 112. Tensor register file 110(5) is configured to provide tensors to tensor operation component 102(2). Thus, the tensors in the tensor register file 110(5) could be used by any of the tensor operation calculators 112(1)-112(3).

In one embodiment, the tensor register files 110(1)-110(4) represent four different types of tensor register files, each of which is associated with a different set of one or more types of tensor operations. For example, tensor register file 110(1) may be associated with a first set of one or more types of tensor operations, each instance of tensor register file 110(2) may be associated with a second set of one or more types of tensor operations, each instance of tensor register file 110(3) may be associated with a third set of one or more types of tensor operations, and each instance of tensor register file 110(4) may be associated with a fourth set of one or more types of tensor operations. The first through fourth sets of tensor operations may each include one or more types of tensor operations, with each set being different from the others.

Note that more than one of the tensor register files 110 can be accessed simultaneously (for both read access and write access). This can help allow the various tensor operation calculators 112 to remain busy, which makes efficient use of the resources in the hardware accelerator 100. For example, tensor operation calculator 112(1) may perform a read access of tensor register file 110(4) at the same time that the instance tensor operation calculator 112(2) in tensor operation component 102(2) performs a read access of tensor register file 110(2), and at the same time that the instance tensor operation calculator 112(3) in tensor operation component 102(2) performs a read access of tensor register file 110(3).

In one embodiment, the hardware accelerator 100 is configured to process chains of machine instructions. In one embodiment, the chain is an atomic unit of computation. For example, the chain may begin with a machine instruction to load a tensor from memory external to the hardware accelerator 100, and may end with a machine instruction to store a tensor to memory external to the hardware accelerator 100. However, no other machine instructions in the chain loads or store tensors to or from memory, in one embodiment. Further details of one example of a chain of machine instructions are shown and discussed with reference to FIG. 3A.

Figure 2:
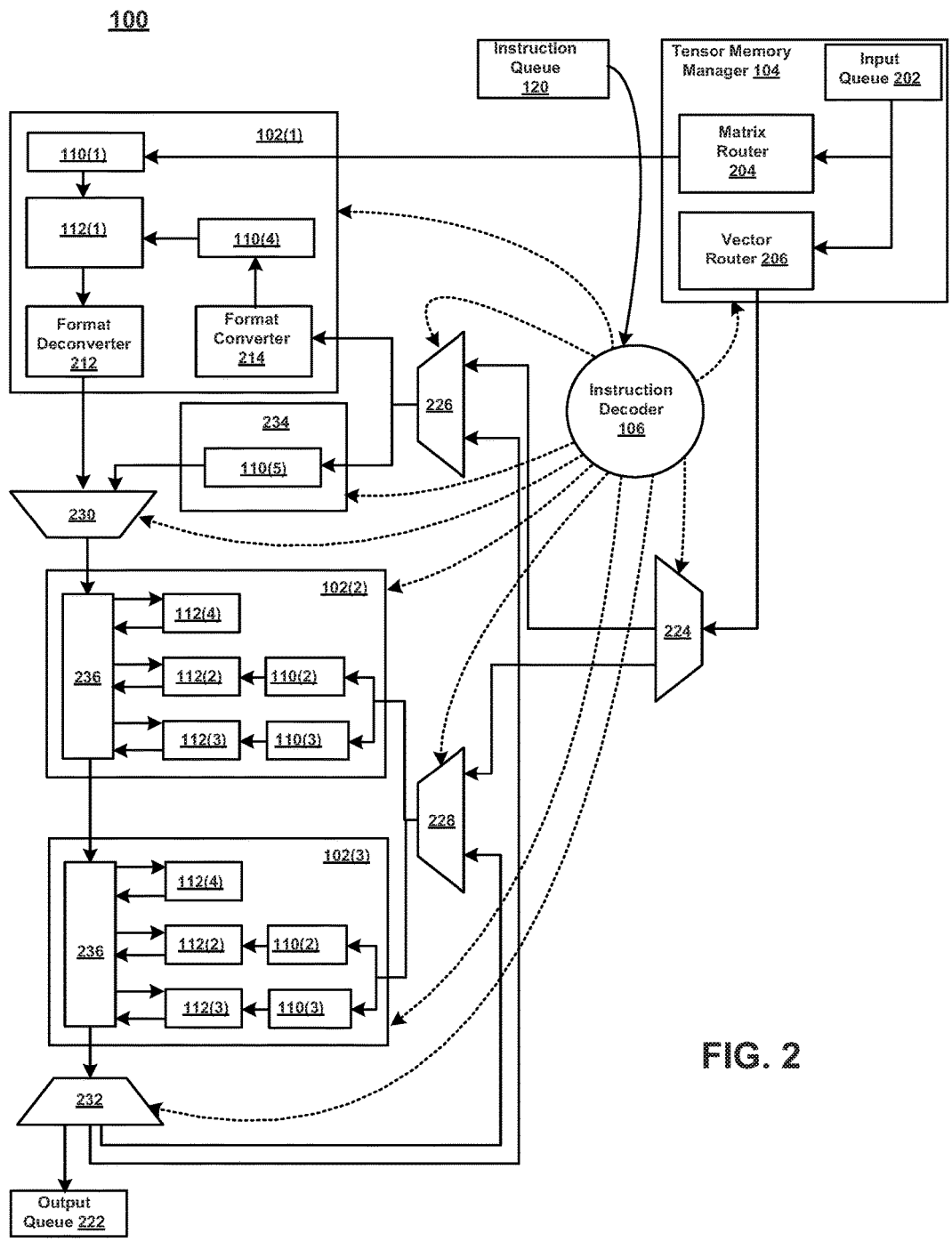
FIG. 2 depicts further details of one embodiment of a hardware accelerator.

FIG. 2 depicts further details of one embodiment of a hardware accelerator 100. The hardware accelerator 100 may also be referred to as a tensor processor. FIG. 2 shows one possible configuration; however, note that the hardware accelerator 100 could have many different configuration. The configuration may be tailored to the types of operations that the hardware accelerator 100 is expected to perform. This allows the hardware accelerator 100 to be extremely efficient. The configuration of FIG. 2 may be used to perform operations (or calculations) in a deep neural network, but is not limited to deep neural networks.

In the embodiment of FIG. 2, tensor operation component 102(1) may perform a matrix-vector multiply. Thus, tensor register file 110(1) may be used to store matrices to be used in the matrix-vector multiply. Tensor register file 110(1) may be used to store vectors to be used in the matrix-vector multiply.

In the embodiment of FIG. 2, tensor operation component 102(1) includes a format converter 214 and a format de-converter 212. The format converter 214 may be used to convert a format of the input tensor to one that is more suitable for the matrix-vector multiply. In one embodiment, the format converter 214 performs a conversion from floating point to block floating point. In one embodiment, the format de-converter 212 performs a conversion from block floating point back to floating point. Note that the tensors throughout the hardware accelerator 100 are not limited to a particular format. For example, scaler values in the elements of a tensor could be represented in fixed point, floating point, block floating point, etc.

In the embodiment of FIG. 2, tensor operation component 102(2) has a crossbar component 236. The crossbar component 236 is configured to route tensors that are input to the tensor operation component 102(2) to a suitable tensor operation calculator 112(2), 112(3), 112(4). The crossbar component 236 may also be configured to route tensors from tensor operation calculator 112 in tensor operation component 102(2) to another tensor operation component 102(2). The crossbar component 236 could include multiplexers and de-multiplexers, which respond to control signal from the instruction decoder 106 to route the tensors.

Note that a tensor operation calculator 112 may have a dedicated tensor register file 110. For example, tensor register file 110(2) may be dedicated to tensor operation calculator 112(2), and tensor register file 110(3) may be dedicated to tensor operation calculator 112(3).

Tensor operation calculator 112(4) is configured to perform an operation on a single tensor. One example is to take the sigmoid of each element in the tensor. Another example is to take the hyperbolic tangent of each element in the tensor. Another example is to perform a "ReLU" on each element in the tensor. A ReLU refers to a rectified linear unit. Another example is to raise each element in the tensor to the power of $e^x$. Note that tensor operation calculator 112(4) could be broken into different calculation components, or a single calculation component may be able to perform multiple types of calculations.

Also note that some tensor calculation components 112 input two tensor operands, whereas other tensor calculation components input a single tensor operand. For example, tensor operation calculator 112(2) has two inputs for tensor operands (as indicated by the two input arrows). Likewise, tensor operation calculator 112(3) has two inputs for tensor operands (as indicated by the two input arrows). However, tensor operation calculator 112(4) has only input for tensor operands (as indicated by the single input arrow. Each tensor calculation component in tensor operation component 102(2) outputs a tensor to the crossbar component 236. The crossbar component 236 in tensor operation component 102(2) outputs tensors to tensor operation component 102(3).

Tensor operation component 102(3) has similar components and operation as just discussed with respect to tensor operation component 102(2). A difference being that tensor operation component 102(3) is "downstream" from tensor operation component 102(2).

The instruction decoder 106 receives machine instructions from the instruction queue 120, decodes the machine instructions, and issues control signals to other components in the hardware accelerator 200. The control signals may also be referred to as sub-component commands. The control signals are represented in FIG. 2 by dashed arrows emanating from the instruction decoder 106.

The instruction decoder 106 sends control signals (or sub-component commands) to each of the tensor operation components 102(1)-102(3). The control signals include sub-component commands that instruct the tensor operation components 102 how to operate on the tensors in the tensor register files 110. Together, the tensor operation components may operate as a pipeline to implement a chain of instructions.

The hardware accelerator 100 includes several multiplexers 226, 228, 230 and two de-multiplexers 224 and 232, which are used to control the flow of tensors. The instruction decoder 106 sends control signals to the multiplexers 226, 228, 230 and de-multiplexers 224 and 232 to route the tensors. The instruction decoder 106 also sends a control signal to multi-function initial tensor component 234, which provides tensors to multiplexer 230.

Multiplexer 230 receives tensors output from tensor operation component 102(1), and a tensor from tensor register file 110(5) in the multi-function initial tensor component 234. For example, multiplexer 230 has a first input that receives a first tensor from tensor operation component 102(1) and a second input that receives a second tensor from tensor register file 110(5) in the multi-function initial tensor component 234. Multiplexer 230 outputs one of the tensors to tensor operation component 102(2) responsive to a control signal from instruction decoder 106. In this example, the tensor is provide to crossbar 236 in tensor operation component 102(2).

De-multiplexer 232 receives a tensor output from tensor operation component 102(3). That tensor is routed to one or more of output queue 222, multiplexer 226, and/or multiplexer 228 responsive to a control signal from instruction decoder 106.

The tensor memory manager 104 includes an input queue 202, matrix router 204, and vector router 206. The input queue gates the flow of tensors into the hardware accelerator 200. The input queue 202 may be used to store tensors as they are first provided to the hardware accelerator 200 from memory external to the hardware accelerator 200 such as memory 1312 (see FIG. 13). These tensors may include matrices and/or vectors.

The tensor memory manager 104 manages the flow of tensors from the input queue 202 to various elements in the hardware accelerator 200. The tensor memory manager 104 may receive control signals from the instruction decoder 106, to instruct the tensor memory manager 104 as to the routing of the tensors. The matrix router 204 is configured to route matrices from the input queue 202 to tensor register file 110(1). Thus, in this embodiment, each entry in tensor register file 110(1) may store a matrix. The vector router 206 is configured to route vectors from the input queue 202 to de-multiplexer 224. De-multiplexer 224 provides vectors to multiplexer 226 and to multiplexer 228, in response to control signals from the instruction decoder 106.

Thus, multiplexer 226 has a first input that receives a first vector from de-multiplexer 224 and a second input that receives a second vector from de-multiplexer 232. Multiplexer 226 has an output that is used to provide a vector to tensor register file 110(4) and/or 110(5) responsive to a control signal from the instruction decoder 106. Tensor register file 110(4) is in tensor operation component 102(1). Tensor register file 110(5) is in multi-function initial tensor component 234. In one embodiment, both tensor register files 110(4) and 110(5) are used to stored "initial" tensors at/near the beginning of chain of instructions.

Multiplexer 228 has a first input that receives a first vector from de-multiplexer 224 and a second input that receives a second vector from de-multiplexer 232. Multiplexer 228 has an output that is used to provide a vector to tensor register files 110(2) and 110(3), responsive to control signals from instruction decoder 106. In one embodiment, responsive to a control signal from instruction decoder 106, multiplexer 228 provides one of its input vectors to all instances of tensor register files 110(2). In one embodiment, responsive to a control signal from instruction decoder 106, multiplexer 228 provides one of its input vectors to all instances of tensor register files 110(3).

Thus, multiplexer 228 may be used to route a vector to all instances of a tensor register file that are associated with a particular type of tensor operation. For example, if a vector is to be used for a vector-vector multiply, the instruction decoder 106 may send the appropriate control signals to route that vector to all instances of tensor register files that are dedicated to a vector-vector multiplier. As another example, if a vector is to be used for a vector-vector addition/subtraction, the instruction decoder 106 may send the appropriate control signals to route that vector to all instances of tensor register files that are dedicated to a vector-vector adder/subtractor.

In one embodiment, tensor operation components 102(2) and 102(3) are configured to operate on vectors, but not on matrices. Note that the tensor operation components 102(2) and 102(3) could also be configured to perform operate on matrices. In this case, multiplexers 226 and 228 could provide matrices to the tensor register files 110 in the tensor operation components 102(2) and 102(3). Thus, tensor memory manager 104 could route matrices to de-multiplexer 224 instead of, or in addition to routing vectors to de-multiplexer 224.

The output queue gates the flow of tensors out the hardware accelerator 200. For example, tensors may be stored to memory external to the hardware accelerator 200, such as memory 1312 (see FIG. 13).

Figure 3A:
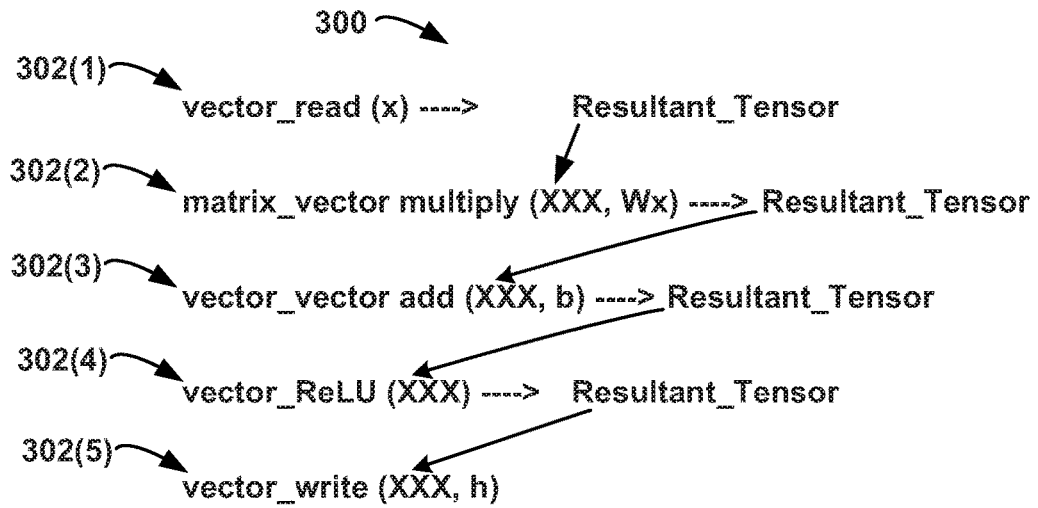
FIG. 3A shows an example of a chain of machine instructions.

In one embodiment, a tensor that results from one machine instruction executed in a hardware accelerator 100 (including but not limited to the embodiments of hardware accelerators 100 in FIG. 1 and/or 2) is used as an input tensor for the next machine instruction in the chain. To illustrate, FIG. 3A shows an example of a chain 300 of machine instructions 302(1)-302(5). The example chain 300 starts with a "vector_read" machine instruction 302(1) to read a vector from location "x" in memory. In this example, the destination in which to load the vector is not expressly specified in the vector_read machine instruction 302(1). In one embodiment, the vector that is loaded by the vector_read machine instruction is used as an input to the next machine instruction in the chain. The result of executing the "vector_read" machine instruction produces what is referred to herein as a "resultant tensor."

The second machine instruction 302(2) is a "matrix_vector multiply" instruction to perform a matrix-vector multiply. This is one example of a two tensor operation. Hence, two tensor operands are necessary for this machine instruction. Note that only one tensor operand ("Wx") is specified. The "XXX" indicates that one of the tensor operands is not specified in the machine instruction 302(2). Herein, this is referred to as a "missing tensor operand." In this example, the resultant tensor from the "vector_read" machine instruction 302(1) may be used for the missing tensor operand.

The third machine instruction 302(3) is a "vector_vector add" instruction to add two vectors. This is another example of a two tensor operation. Hence, two tensor operands are necessary for this machine instruction 302(3). Again, note that only one tensor operand ("b") is specified. Again, the "XXX" indicates that one of the tensor operands is not specified in the machine instruction 302(3). In this example, the resultant tensor from the "matrix_vector multiply" machine instruction 302(2) may be used for the missing tensor operand.

The fourth machine instruction 302(4) is a "vector_ReLU" instruction to perform a ReLU operation on a vector. This is an example of a single tensor operation. Hence, one tensor operand is necessary for this machine instruction 302(4). Note that no tensor operands are specified. Again, the "XXX" indicates a missing tensor operand. In this example, the resultant tensor from the "vector_vector add" machine instruction 302(3) may be used for the missing tensor operand.

The fifth machine instruction 302(5) is a "vector_write" instruction to write a vector to location "h" in memory. However, the vector to be written to memory is not specified. The "XXX" indicates a missing tensor operand. In this example, the resultant tensor from the "vector_ReLU" machine instruction 302(4) may be used for the missing tensor operand.

In one embodiment, the chain 300 is used to model a neuron in a deep neural network. In one embodiment, the chain 300 contains a machine instruction that serves as an activation function. The term "activation function" is well-understood by those in the field of deep neural networks. In FIG. 3A, machine instruction 302(4) serves as an activation function. Other possible activation functions include, but are not limited to, sigmoid and hyperbolic tangent.

One observation to be made of the chain of instructions is that the initial tensor to be used may be read in from memory by the vector_read command. As another example, a "matrix_read" instruction may be used to read in an initial matrix to a tensor register file. Another observation to be made is that the chain ends with an instruction to store a vector to memory. However, there are no memory accesses between the initial vector read and the vector write. Hence, the chain may be considered to be an atomic unit of computation.

In one embodiment, the beginning of the chain is defined by a read from memory, such as machine instruction 302(1), and the end of the chain is defined by a write to memory, such as machine instruction 302(5). However, there could be another instruction prior to the read from memory, such as the tiling factor to be discussed below (see FIG. 12, for example). Also, one option is for a machine instruction to expressly define the start or end of the chain, such as a "chain_begin" instruction or a "chain_end" instruction. For example, if the chain does not store a tensor to memory at the end, then a "chain_end" instruction might be used to indicate the end of the chain.

Another observation to be made of the chain of instructions is that for the first machine instruction, the tensor that results from executing the machine instruction is used as a tensor input to the following machine instruction. The middle machine instructions each receive a tensor input from the immediate prior machine instruction and provide a tensor to the immediate following machine instruction. The final machine instruction receives a tensor from the immediate prior machine instruction. This pattern is one example, and there may be some deviation from this pattern in other chains.

Another observation to be made of the chain of instructions is that those machine instructions that receive a tensor operand from another machine instructions can be coded with fewer bits than if the tensor operand were expressly specified. For example, the matrix_vector multiply machine instruction can be coded with a one byte opcode ("matrix_vector multiply") and a one byte operand ("Wx"). Not specifying the missing operand may save one byte. Similar reasoning applies to other machine instruction that have a missing tensor operand. This saves a considerable amount of memory. Note that expressing a program such as a deep neural network into machine code may require an extreme amount of memory. Hence, reducing the number of bits in a machine instruction can provide a substantial memory savings. There may also be time saved in decoding the machine instructions by the instruction decoder 106.

In one embodiment, the instruction decoder 106 is configured to send control signals to cause the chain of machine instructions to execute. For example, the instruction decoder 106 may cause the initial tensor to be loaded into tensor register file 110(4) ("vector_read"). The instruction decoder 106 may cause tensor operation calculator 112(1) to perform a matrix-vector multiply using a matrix from tensor register file 110(1) and a tensor from tensor register file 110(4) in tensor operation component 102(1) ("matrix_vector multiply"). The instruction decoder 106 may cause tensor operation calculator 112(2) in tensor operation component 102(2) to perform a vector-vector multiply using the tensor that results from the matrix-vector multiply in tensor operation calculator 112(1) and a tensor in tensor register file 110(2) in tensor operation component 102(2) ("vector_vector add"). The instruction decoder 106 may cause tensor operation calculator 112(4) in tensor operation component 102(2) to perform a vector ReLU using the tensor that results from the vector-vector multiply ("vector_ReLU"). The instruction decoder 106 may cause the tensor that results from the vector ReLU to be stored to memory external to the hardware accelerator 100 ("vector_write"). This chain of machine instructions is just one example of a myriad of possible sequences.

In one embodiment, the hardware acceleration has a configuration that is tailored to the way machine instructions are typically chained together. For example, referring to the example chain 300, the matrix_vector multiply instruction 302(2) might be executed in tensor operation calculator 112(1), with the resultant tensor being passed downstream to tensor operation component 102(2). Tensor operation component 102(2) may perform machine instructions 302(3) and 302(4). Some chains may have additional machine instructions that might be performed further downstream in tensor operation component 102(3). The configuration may keep the various tensor operation calculators 112 busy a very high percentage of the time. In particular, tensor operation calculator 112(1) might be kept occupied doing matrix_vector multiply a high percentage of the time, which makes very efficient use of the hardware resources.

Figure 3B:
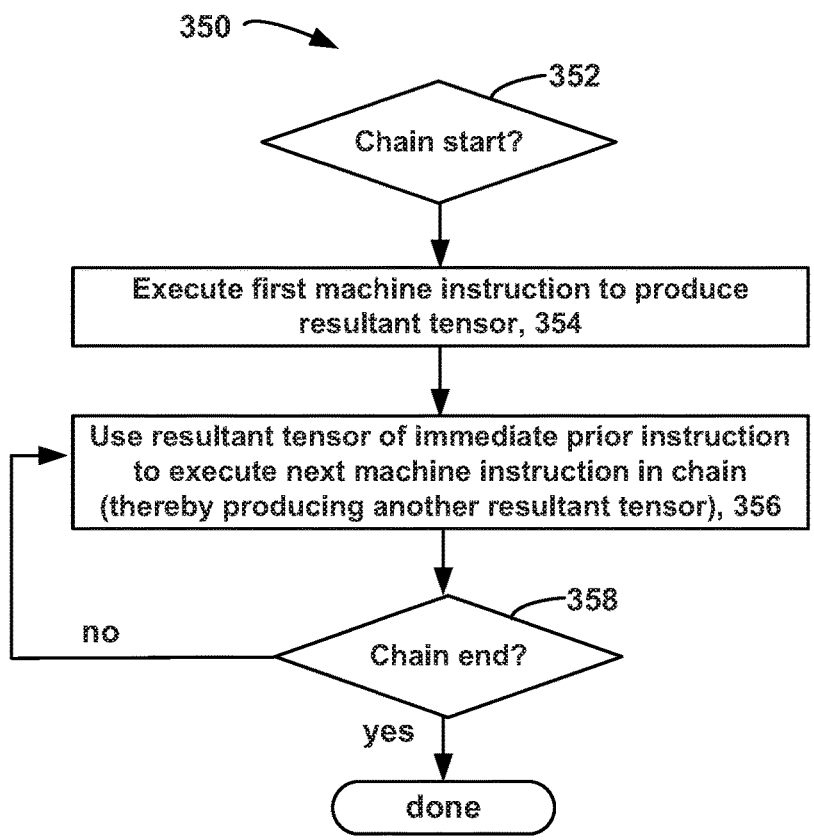
FIG. 3B is a flowchart of one embodiment of a process executing a chain of machine instructions in a tensor processor.

FIG. 3B is a flowchart of one embodiment of a process 350 executing a chain of machine instructions in a tensor processor 100. The process 350 may be implemented in the tensor processor 100 of FIG. 1 or 2, but is not limited thereto. Reference will be made to the example chain of FIG. 3A, but this is just for purposes of discussion. In one embodiment, the chain implements a neuron in a deep neural network.

Figure 12:
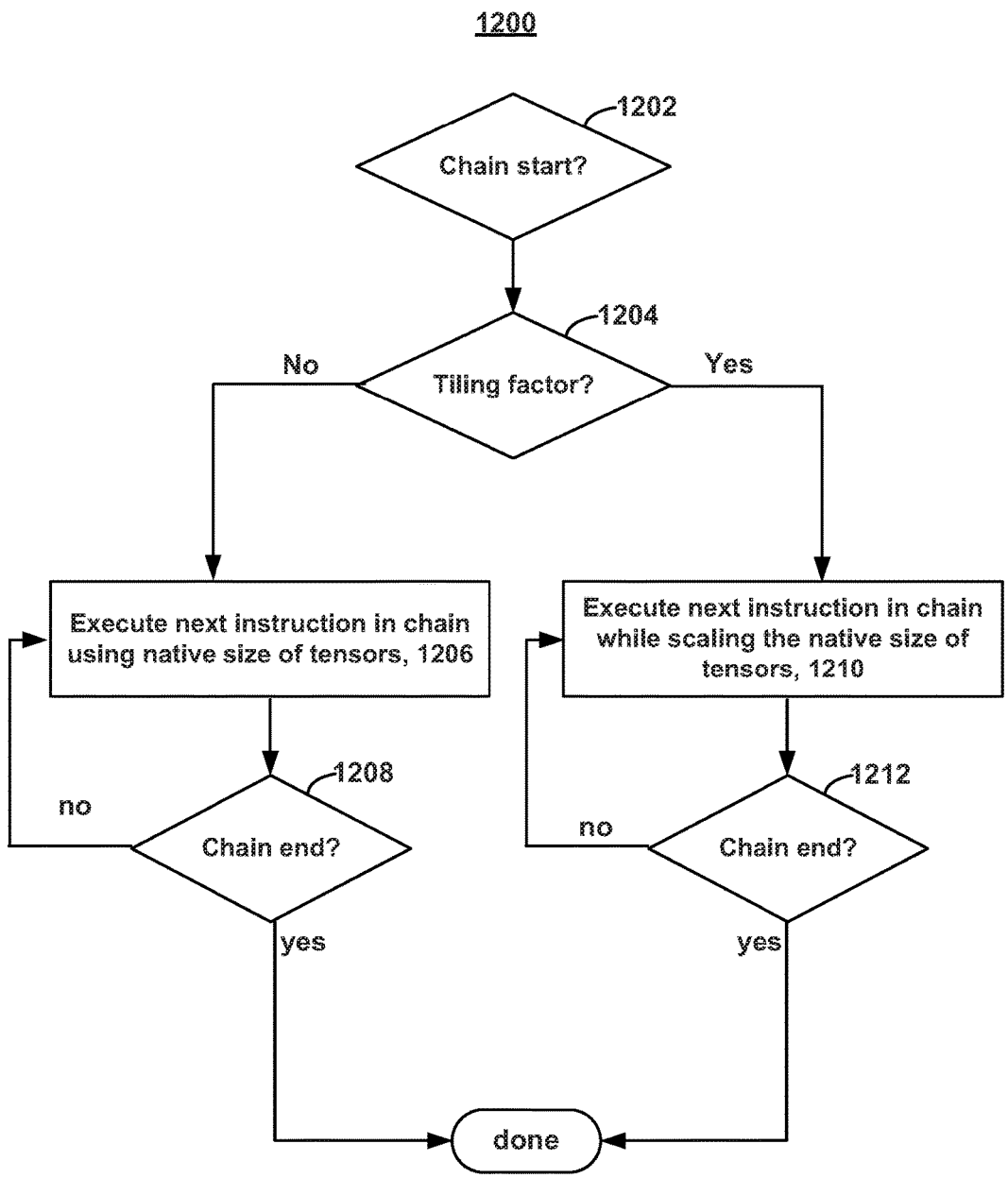
FIG. 12 is a flowchart of one embodiment of a process of executing a chain of machine instructions in a tensor processor based on a tiling factor.

Step 352 includes a determination of whether a new chain has started. In one embodiment, a machine instruction to read a tensor into the tensor processor 100 indicates that a new chain has started. In one embodiment, a machine instruction to alter a native size of tensors indicates that a new chain has started. FIG. 12 below provides further details of one embodiment of a tiling factor that may be used to scale the native size of tensors. Referring to FIG. 3A, as one example, the "vector_read" machine instruction 302(1) indicates that a new chain has started, in that example. Another option is for there to be a "begin_chain" machine instruction. Another option is for there to be a "matrix_read" machine instruction.

Step 354 includes executing the first machine instruction in the chain to produce a resultant tensor. Referring to FIG. 3A, as one example, executing the "vector_read" machine instruction 302(1) produces a resultant tensor by the act of storing the tensor into a tensor register file 110.

Step 356 includes executing the next machine instruction 302 in the chain 300 using the resultant tensor from the immediate prior machine instruction. In one embodiment, the resultant tensor is used for a missing tensor operand. Examples of step 356 have been discussed above in connection with FIG. 3A.

Step 358 is a determination of whether the chain has ended. With respect to the example chain of FIG. 3A, the chain ends after execution of machine instruction 302(5). Another possibility is for there to be a machine instruction of "chain_end" or the like.

The process 350 returns to step 356 to execute the next machine instruction 302 in the chain 300 in the event that the chain has not ended. As noted, the next machine instruction may use the resultant tensor from the immediate prior machine instruction. Thus, the various machine instructions 302 may be considered to be a "chain" in which the link is formed by using the resultant tensor from one machine instruction to execute the next machine instruction.

Figure 3C:
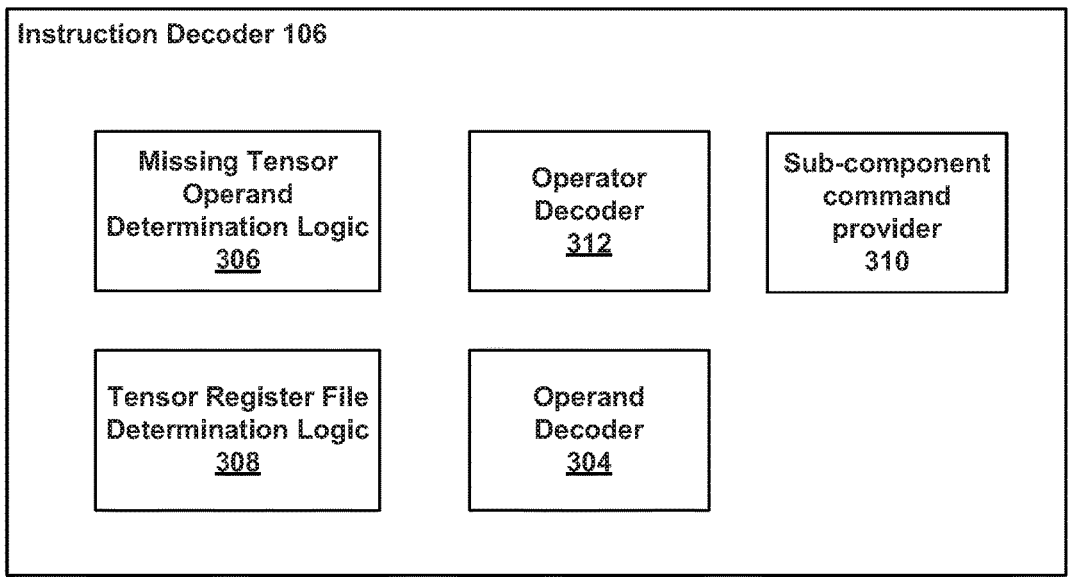
FIG. 3C is a diagram of further details of one embodiment of an instruction decoder.

FIG. 3C is a diagram of further details of one embodiment of an instruction decoder 106. The instruction decoder 106 may be used in the hardware accelerator 100 of FIG. 1 or FIG. 2, but is not limited thereto. The instruction decoder 106 includes an operator decoder 312, an operand decoder 304, missing tensor operand determination logic 306, tensor register file determination logic 308, and sub-component command provider 310.

The operator decoder 312 is configured to decode the opcode portion of machine instructions 302. For example, with respect to the example machine instruction 302(1) of FIG. 3A, the "vector_read" portion may be specified by a unique value of a one byte opcode. Each machine instruction 302 may have a unique value for the one byte opcode. The opcode could be smaller or large than one byte.

The operand decoder 304 is configured to decode the operand portion of a machine instruction (assuming there is an operand). For example, with respect to the example machine instruction 302(1) of FIG. 3A, the "x" portion may be specified by a unique value of a one byte operand field. Some machine instructions do not have an operand field. For example, the embodiment of the vector_ReLU instruction 302(4) in FIG. 3A does not need a field for an operand.

Some machine instructions, which require two tensor operands to execute have just a single operand field. For example, the embodiment of the matrix_vector multiple instruction 302(2) in FIG. 3A requires two tensor operands, but only has a single tensor operand field (e.g., the "Wx"). Note that the "XXX" is used to represent that there are not any bits in machine instruction 302(2) to specify one of the tensor operands needed to execute instruction 302(2).

The missing tensor operand determination logic 306 is configured to determine a missing tensor operand for a machine instruction 302. As noted, some machine instructions may be missing a tensor operand that is needed to execute the machine instruction. Some machine instructions need one tensor operand, but do not specify any tensor operands. Some machine instructions need two tensor operands, but only specify a single tensor operand. In each case, the missing tensor operand determination logic 306 determines the missing tensor operand. In one embodiment, the missing tensor operand determination logic 306 assumes that the missing tensor operand is a tensor that results from a prior machine instruction in the chain.

The tensor register file determination logic 308 may determine which tensor register file 110 should be accessed to store tensors. The tensor register file determination logic 308 may also determine which tensor register file 110 should be accessed when executing a particular type of machine instruction. In one embodiment, the tensor register file 110 is implied by the type of machine instruction. In one embodiment, the tensor register file 110 for a read access is implied by the type of tensor operation that the machine instruction is to perform. Further details are discussed below.

The sub-component command provider 310 is configured to provide commands (or control signals) to the various sub-components in the hardware accelerator 100. For example, sub-component command provider 310 provides commands to the tensor memory manager 104, the tensor operation components 102, the various multiplexers 226, 230, 230, the various de-multiplexers 224, 232, and the multi-function initial tensor component 234.

Figure 4:
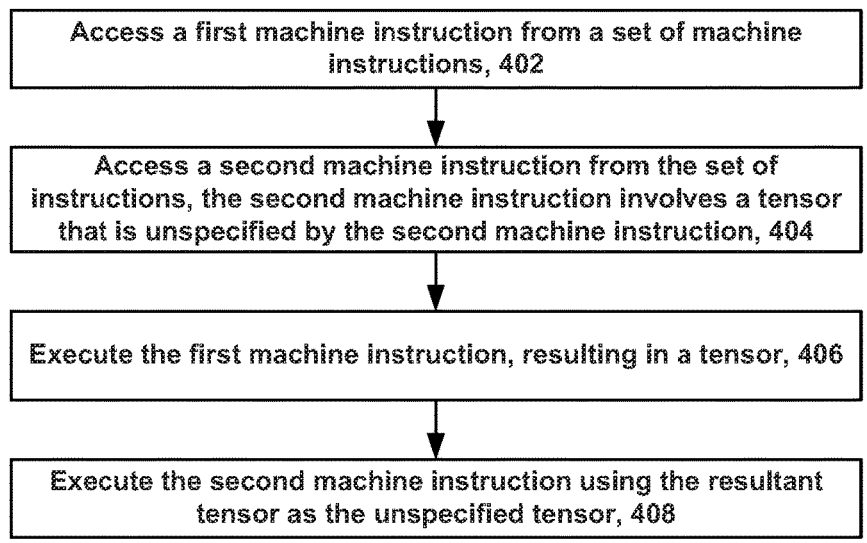
FIG. 4 is a flowchart of one embodiment of a process of executing machine instructions in a hardware accelerator.

FIG. 4 is a flowchart of one embodiment of a process 400 of executing machine instructions in a hardware accelerator 100. The process 400 may be executed within hardware accelerator 100 of FIG. 1 or 2, but is not limited thereto. The process 400 involves using a tensor that results from one machine instruction in a set of machine instructions as an input to another machine instruction in the set. In one embodiment, the set of machine instructions is a chain of machine instructions that are linked by using a resultant tensor from executing one machine instruction to execute the next instruction in the chain that needs a tensor. In one embodiment, the chain implements a neuron in a deep neural network.

In step 402, a first machine instruction is accessed from a set of machine instructions. In step 404, a second machine instruction is accessed from the set of machine instructions. The second machine instruction involves a tensor that is not specified by the second machine instruction, in one embodiment. In one embodiment, the second machine instruction is missing a tensor operand.

In step 406, the first machine instruction is executed in the hardware accelerator 100 resulting in a tensor. In one embodiment, step 406 includes loading a tensor into a tensor register file. For example, with respect to FIG. 1 or 2, the tensor may be loaded into any of the tensor register files 110(1)-110(5). Each of these loads results in a tensor being added to a tensor register file, which is referred to herein as a "resultant tensor."

In one embodiment, step 406 includes performing a tensor operation in a tensor operation calculator 112. This could be a single tensor operation or a two tensor operation. As one example of a single tensor operation, a tensor is input to tensor operation calculator 112(4) in tensor operation component 102(2), which takes a sigmoid of each element in the tensor. As another example of a single tensor operation, a tensor is input to tensor operation calculator 112(4) in tensor operation component 102(2), which takes a hyperbolic tangent of each element in the tensor. As another example of a single tensor operation, a tensor is input to tensor operation calculator 112(4) in tensor operation component 102(2), which takes a ReLU of each element in the tensor. In all cases the result of the single tensor operation is what is referred to herein as a "resultant tensor". In one embodiment, the resultant tensor is a vector. In one embodiment, the resultant tensor is a matrix.

As example of a two tensor operation, two tensors are input to tensor operation calculator 112(1) in tensor operation component 102(1), which performs a matrix-vector multiplication. As another example of a two tensor operation, two tensors are input to tensor operation calculator 112(2) in tensor operation component 102(2), which performs a vector-vector multiplication. As another example of a two tensor operation, two tensors are input to tensor operation calculator 112(3) in tensor operation component 102(2), which performs a vector-vector addition. As another example of a two tensor operation, two tensors are input to tensor operation calculator 112(3) in tensor operation component 102(2), which performs a vector-vector subtraction. In all these two tensor cases the result of the two tensor operation is what is referred to herein as a "resultant tensor". In one embodiment, the resultant tensor is a vector. In one embodiment, the resultant tensor is a matrix.

In step 408, the second machine instruction is executed using the resultant tensor from the first machine instruction as the missing tensor operand.

Note that the resultant tensor of the second machine instruction may be used as an input to another machine instruction in the set. For example, there may be a third machine instruction in the set, which has a missing tensor operand. Thus, in one embodiment, a resultant tensor of executing the second machine instruction is used to execute a third machine instruction immediately following the second machine instruction in response to the third machine instruction missing a tensor operand needed to execute the third machine instruction. This may continue on for additional machine instructions in the set that are missing a tensor operand. In one embodiment, the hardware accelerator 100 assumes that whenever there is a missing tensor operand in a machine instruction, that the resultant tensor of the immediate prior machine instruction in the set be used for the missing tensor operand.

Figure 5:
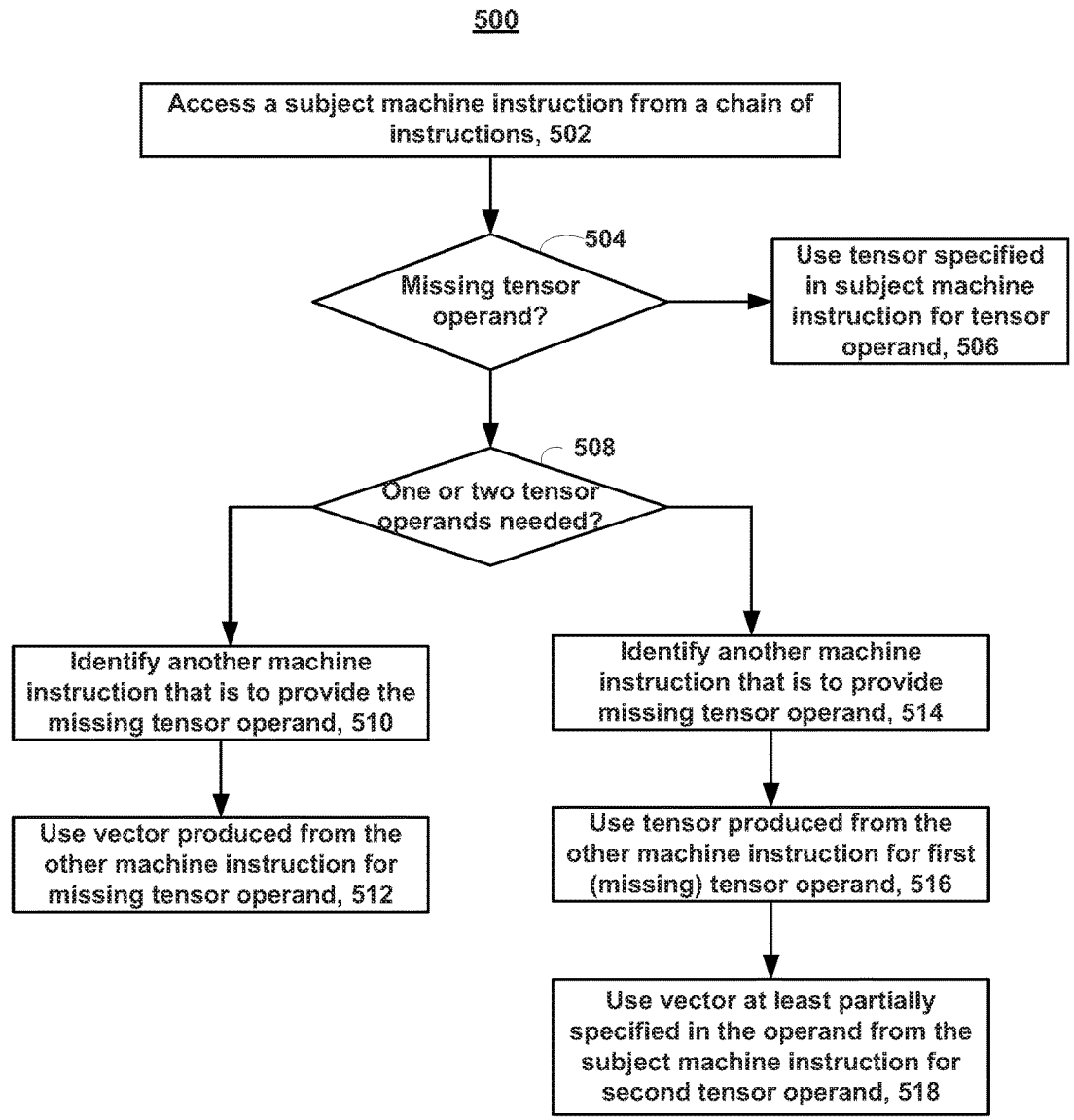
FIG. 5 is a flowchart of one embodiment of a process of executing a machine instruction.

FIG. 5 is a flowchart of one embodiment of a process 500 of executing a machine instruction 302 in a chain of machine instructions. In one embodiment, the chain implements a neuron in a deep neural network. Step 502 includes accessing a machine instruction from a chain of machine instructions. For example, instruction decoder 106 accesses an instruction from instruction queue 120. For purposes of discussion, this will be referred to as the "subject machine instruction."

Step 504 is a determination of whether the subject machine instruction fails to specify a tensor operand that is necessary to execute the tensor operation of the subject machine instruction. In one embodiment, instruction decoder 106 makes this determination. In the event that there is not a missing tensor operand, then circuity in the hardware accelerator 100 executes the subject machine instruction using a tensor specified in the machine instruction, in step 506.

If the subject machine instruction is a missing tensor operand, then the process 500 continues at step 508. Step 508 includes a determination of whether one or two tensor operands are needed to execute the subject machine instruction. In one embodiment, instruction decoder 106 makes this determination. In process 500, it is assumed that at most one tensor operand is missing. In the event that one tensor operand is needed for the subject machine instruction, then steps 510-512 are performed.

In step 510, circuity in the hardware accelerator 100 identifies another machine instruction that is to provide the missing tensor operand. In one embodiment, instruction decoder 106 makes this determination. In one embodiment, circuity in the hardware accelerator assumes that the missing tensor operand is to come from the machine instruction that immediately precedes the subject machine instruction. An exception may be made if the immediately preceding instruction does not result in a tensor, in which case the hardware accelerator can go backwards in the chain to look for a machine instruction capable of providing the missing tensor operand.

In step 512, a resultant tensor from the identified machine instruction is used as the missing tensor operand for the subject machine instruction. In one embodiment, the crossbar component 236 supplies the missing tensor to tensor operation calculator 112(4). Note that the missing tensor operand might come from another tensor operation calculator 112, such as tensor operation calculator 112(2) or tensor operation calculator 112(3). The crossbar component 236 may act in response to a control signal from the instruction decoder 106. The instruction decoder 106 may control other elements, as well, to provide the missing tensor. For example, instruction decoder 106 could send a control signal to multiplexer 230 to select either a tensor from tensor operation component 102(1) or tensor register file 110(5). Other possibilities exist for providing the missing tensor.

In the event that two tensor operands are needed for the subject machine instruction, then steps 514-518 are performed. Step 514 may include circuitry in the hardware accelerator identifying a machine instruction that is to provide the missing tensor operand in a similar manner as step 510. The identification of the other machine instruction in step 514 may be similar to step 510.

Step 516 includes using the resultant tensor from the machine instruction identified in step 514 as a first tensor operand for the subject machine instruction. In one embodiment, the crossbar component 236 in tensor operation component 102(2) supplies the first (missing) tensor to tensor operation calculator 112(2) or to tensor operation calculator 112(3). Note that the missing tensor operand might come from another tensor operation calculator 112 in tensor operation component 102(2). The crossbar component 236 may act in response to a control signal from the instruction decoder 106. The instruction decoder 106 may control other elements, as well, to provide the first (missing) tensor. For example, instruction decoder 106 could send a control signal to multiplexer 230 to select either a tensor from tensor operation component 102(1) or tensor register file 110(5). Other possibilities exist for providing the missing tensor.

Step 518 includes using a tensor that is at least partially specified in the subject machine instruction as a second tensor operand for the subject machine instruction. For example, a tensor from tensor register file 110(2) may be provided to tensor operation calculator 112(2). As another example, a tensor from tensor register file 110(3) may be provided to tensor operation calculator 112(3).

Note that in some embodiments, the second tensor is only partially specified in the subject machine instruction. In one embodiment, the subject machine instruction does not expressly specify which of the tensor register files 110 contains the second tensor. Hence, in one embodiment, the subject machine instruction "only partially specifies" the second tensor operand. In one embodiment, the hardware accelerator infers which tensor register file 110 contains the second tensor based on the type of tensor operation to be performed. For example, if the subject machine instruction is a vector-vector multiply, the hardware accelerator 100 may infer that the second tensor is located in a tensor register file 110 that is dedicated to a tensor operation calculator 112 that is configured to perform vector-vector multiplication. The subject machine instruction may expressly specify a location within a tensor register file, however. For example, the subject machine instruction may expressly contain an index value. Note that the subject machine instruction could completely specify the second tensor operand. For example, the subject machine instruction could also specify a tensor register file that contains the second tensor operand.

FIGS. 6A-6D are flowcharts of embodiments of processes of different techniques that may be used to use a tensor that results from one machine instruction as a missing tensor operand in another machine instruction.

Figure 6A:
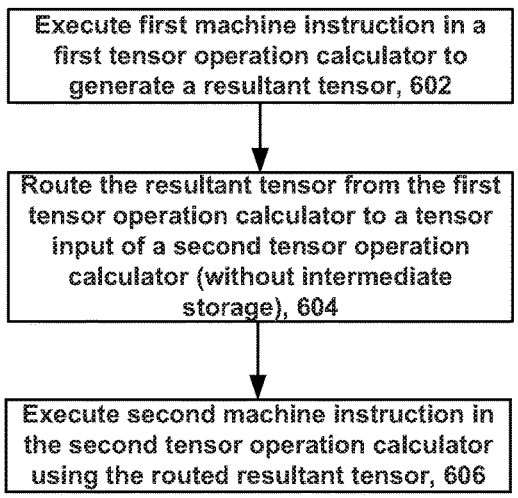
FIGS. 6A-6D are flowcharts of embodiments of processes of different techniques that may be used to use a resultant tensor from one machine instruction as a missing tensor operand in another machine instruction.

FIG. 6A is a flowchart of one embodiment of a process 600 of executing machine instructions in a hardware accelerator 100. Process 600 is for an example in which the machine instruction having the missing operand is for a single tensor operation. By a "single tensor operation" it is meant that the operation involves just one tensor.

In step 602, a first machine instruction is executed in a first tensor operation calculator 112 to generate a tensor. Herein, this is referred to as a "resultant tensor." This might be any of the tensor operation calculators 112 in FIG. 1 or 2, but is not limited to those examples. The first tensor operation calculator 112 might be configured to perform either a single tensor operation or a two tensor operation. Step 602 is one embodiment of step 406 in process 400.

For the sake of illustration, in step 602, a matrix-vector multiply might be performed in tensor operation calculator 112(1), a vector-vector multiply might be performed in one of the instances of tensor operation calculator 112(2), vector-vector addition (or subtraction) might be performed in one of the instances of tensor operation calculator 112(3), or a single tensor operation might be performed in one of the instances of tensor operation calculator 112(4). In one embodiment, each of these tensor operations results in a vector.

In step 604, the resultant tensor is routed from the first tensor operation calculator 112 to an input of a second tensor operation calculator 112. In one embodiment, this resultant tensor is routed without intermediate storage of the resultant tensor in a register or other storage. In one embodiment, instruction decoder 106 issues control signals to route the resultant tensor.

In step 606, a second machine instruction is executed in the second tensor operation calculator 112 based on the resultant tensor. As noted, the second tensor operation calculator 112 is configured to perform a single tensor operation. With respect to the example of FIG. 2, the resultant tensor may be routed to either tensor operation calculator 112(4) of tensor operation component 102(2) or tensor operation calculator 112(4) of tensor operation component 102(3). Step 606 is one embodiment of step 408 in process 400.

Using the example of tensor operation calculator 112(4) of tensor operation component 102(2) receiving the resultant tensor, the resultant tensor might be provided directly from any of (but not limited to) tensor operation calculator 112(2) of tensor operation component 102(2), tensor operation calculator 112(3) of tensor operation component 102(2), or tensor operation calculator 112(1) of tensor operation component 102(1). In one embodiment, instruction decoder 106 provides control signals to one or more of tensor operation component 102(1), multiplexer 230, and/or tensor operation component 102(2) to route the resultant tensor. The instruction decoder 106 could issue control signals to other elements in the hardware accelerator 100, as well, to route the resultant tensor.

Figure 6B:
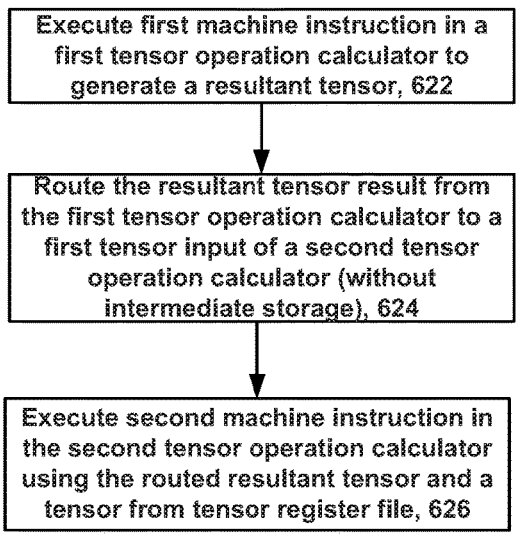

FIG. 6B is a flowchart of one embodiment of a process 620 of executing machine instructions in a hardware accelerator 100. Process 620 is for an example in which the machine instruction having the missing operand is for a two tensor operation.

In step 622, a first machine instruction is executed in a first tensor operation calculator 112 to generate a tensor. This might be any of the tensor operation calculators 112 in FIG. 1 or 2, but is not limited to those examples. The first tensor operation calculator 112 might be configured to perform either a single tensor operation or a two tensor operation. Step 622 is one embodiment of step 406 in process 400.

For the sake of illustration, in step 622, a matrix-vector multiply might be performed in tensor operation calculator 112(1) to generate a vector, a vector-vector multiply might be performed in one of the instances of tensor operation calculator 112(2), vector-vector addition (or subtraction) might be performed in one of the instances of tensor operation calculator 112(3), or a single tensor operation might be performed in one of the instances of tensor operation calculator 112(4).

In step 624, the resultant tensor is routed from the first tensor operation calculator 112 to a first tensor input of a second tensor operation calculator 112. In one embodiment, this resultant tensor is routed without intermediate storage of the resultant tensor in a register or other storage. In one embodiment, instruction decoder 106 issues control signals to route the resultant tensor. With respect to the example of FIG. 2, the resultant tensor may be routed to tensor operation calculator 112(2) or tensor operation calculator 112(3) in either tensor operation component 102(2) or 102(3). In one embodiment, the resultant tensor is routed through crossbar 236.

In step 626, a second machine instruction is executed in the second tensor operation calculator 112 based on the routed tensor and a second tensor from a tensor register file. With respect to the example of FIG. 2, the second tensor may come from tensor register file 110(2) when tensor operation calculator 112(2) is the second tensor operation calculator. The second tensor may come from tensor register file 110(3) when tensor operation calculator 112(3) is the second tensor operation calculator. Step 626 is one embodiment of step 408 of process 400. In one embodiment, the second tensor is only partially specified by the second machine instruction, as discussed with respect to step 518 in process 500.

Figure 6C:
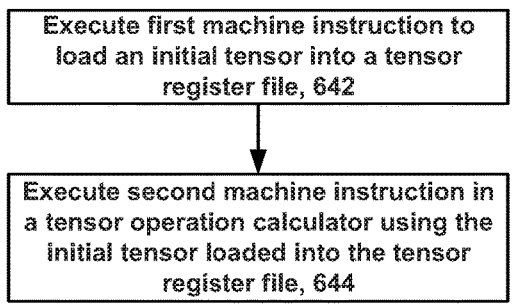

The first machine instruction (which provides the missing tensor operand) need not be executed in a tensor operation calculator 112. FIG. 6C is a flowchart of one embodiment of a process 640 in which the first machine instruction is a tensor load instruction. In step 642, a first machine instruction is executed to load a tensor into a tensor register file 110. In one embodiment, the first machine instruction indicates a memory location external to the hardware accelerator 100 from which the tensor is to be accessed. Step 642 is one embodiment of step 406 of process 400. This tensor load machine instruction is at or at least near the beginning of the chain of instructions, in one embodiment. In one embodiment, this tensor load machine instruction comes prior to any machine instruction to perform a tensor calculation in, for example, one of the tensor operation calculator 112. Thus, the first machine instruction may load an "initial tensor" for the chain of machine instructions.

In one embodiment, a tensor is loaded into one or more of the tensor register files 110(1)-110(5) of FIG. 2, in step 642. In one embodiment, the first machine instruction does not expressly specify which tensor register file to load the tensor. The hardware accelerator 100 determines which of the tensor register files should receive the tensor based on the type of tensor operation calculator 112 that might use the tensor, in one embodiment. Further details are discussed below.

Step 644 includes executing the second machine instruction in a tensor operation calculator 112 using the initial tensor that was loaded into the tensor register file 110. Step 664 is one embodiment of step 408 of process 400. In one embodiment, the tensor operation calculator 112 also uses a second tensor. As one example, step 644 may include tensor operation calculator 112(1) using an initial tensor loaded into tensor register file 110(4) in tensor operation component 102(1) by the first machine instruction, and a matrix from tensor register file 110(1). As another example, step 644 may include tensor operation calculator 112(2) using an initial tensor loaded into tensor register file 110(5) in multi-function initial tensor component 234 by the first machine instruction, and a tensor from tensor register file 110(2). As another example, step 644 may include tensor operation calculator 112(4) using an initial tensor loaded into tensor register file 110(5) in multi-function initial tensor component 234 by the first machine instruction in a single tensor operation. Many other possibilities exist for step 644.

Note that the second machine instruction does not necessarily involve performing a tensor calculation in a tensor operation calculator 112. For example, the second machine instruction may be an instruction to store a tensor to memory external to the hardware accelerator 100. In this case, the second machine instruction may come at the end of the chain of instructions.

Figure 6D:
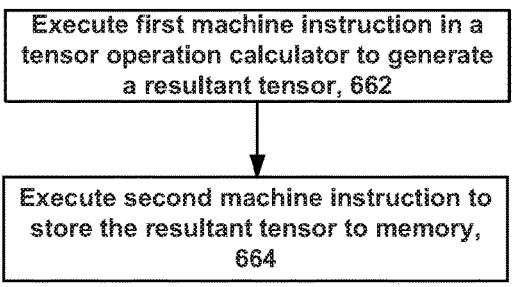

FIG. 6D is a flowchart of one embodiment of a process 660 in which the second machine instruction is a tensor store instruction. In step 662, a first machine instruction is executed in a tensor operation calculator 112 to generate a tensor. This might be a single tensor operation or a two tensor operation. Thus, this could involve any of the tensor operation calculators 112(1)-112(4) in FIG. 2, for example. Step 662 is one embodiment of step 406 of process 400.

Step 664 includes executing a second machine instruction to store the resultant tensor from the first machine instruction. As one example, the instruction decoder 106 might issue control signals to tensor operation component 102(3) and to de-multiplexer 232 to route a tensor from one of the tensor operation calculators 112 in tensor operation component 102(3) to the output queue 222. The tensor may then be transferred from output queue 222 to memory external to the hardware accelerator 100. Step 664 is one embodiment of step 408 of process 400.

Figure 7:
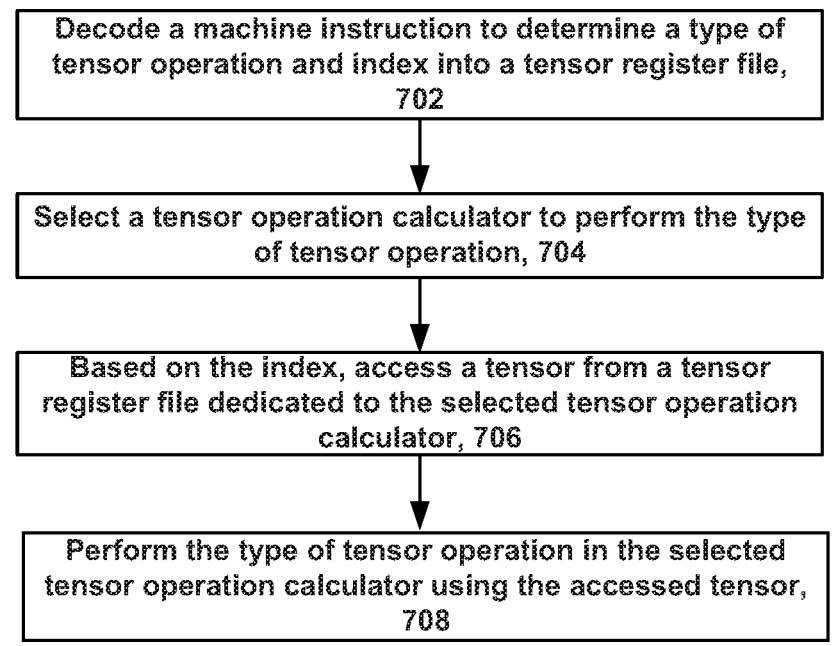
FIG. 7 is a flowchart of one embodiment of a process of accessing a tensor from a tensor register file.

FIG. 7 is a flowchart of one embodiment of a process 700 of accessing a tensor from a tensor register file 110. The process 700 involves executing a machine instruction 302 that needs a tensor from a tensor register file 110. In process 700, the machine instruction is not required to specify what tensor register file 110 contains the tensor. In one embodiment, the hardware accelerator 100 infers what tensor register file 110 to access based on the type of tensor operation that is to be performed.

Step 702 includes the instruction decoder 106 decoding an opcode of a machine instruction to determine what type of tensor operation is to be performed to execute the machine instruction. In step 702 the instruction decoder 106 may also determine an index into a tensor register file 110. In one embodiment, the machine instruction has an operand field that specifies the index into a tensor register file 110. However, the actual tensor register file is not specified in the machine instruction of one embodiment.

Referring to FIG. 3A, machine instructions 302(2) and 302(3) are two examples of machine instructions that have an operand field that specifies an index into a tensor register file 110, without specifying an actual tensor register file. In FIG. 3A, the contents between the parentheses is the operand field. Recall that the "XXX" is merely to represent that the tensor operand is missing. That is, XXX means that the machine instruction 302 does not have any bits to specify a tensor operand that is needed to execute the machine instruction. The "Wx" in machine instruction 302(2) may be a one byte value that is an index into a tensor register file 110, as one example. The "b" in machine instruction 302(3) may be a one byte value that is an index into a tensor register file 110, as one example.

Step 704 includes selecting a tensor operation calculator 112 to perform the tensor operation. In one embodiment, the tensor operation calculator 112 has a tensor register file 110 that is dedicated to the tensor operation calculator 112. That is, the tensor operation calculator 112 is the only component that accesses this instance of the tensor register file 110, in one embodiment. Step 704 may be performed by instruction decoder 106 and/or crossbar 236, but is not limited to those elements.

With reference to the example machine instruction 302(2) for matrix_vector multiply, tensor operation calculator 112(1) might be selected. In this example, tensor operation calculator 112(1) is configured to perform matrix-vector multiplies. With reference to the example machine instruction 302(3) for vector_vector add, tensor operation calculator 112(3) might be selected. In this example, tensor operation calculator 112(3) is configured to perform vector-vector addition.

Step 706 includes accessing a tensor from a tensor register file that is dedicated to the selected tensor operation calculator 112. The index from the machine instruction 302 may be used to determine the location of the tensor within the tensor register file.

With reference to the example in which tensor operation calculator 112(1) is selected, tensor register file 110(1) may be accessed. In this example, the index "Wx" may be used to select an entry in tensor register file 110(1) to provide a matrix to tensor operation calculator 112(1).

With reference to the example in which tensor operation calculator 112(3) is selected, tensor register file 110(3) may be accessed. In this example, the index "b" may be used to select an entry in tensor register file 110(3) to provide a tensor to tensor operation calculator 112(3).

Note that an outcome of step 706 is that the correct tensor register file 110 is accessed without the machine instruction specifying which of the tensor register files 110 to access. This may be referred to herein as implied tensor register file read access.

Step 708 includes the selected tensor operation calculator 112 performing the tensor operation using the tensor that was accessed from the tensor register file 110. The tensor operation calculator 112 may also input another tensor in order to perform a tensor operation, such as, but not limited to, matrix-matrix multiply, matrix-vector multiply, vector-vector multiply, vector-vector addition, or vector-vector subtraction.

As noted above, rather than having a large tensor register file that stores tensors for all types of tensor operations, some embodiments of the hardware accelerator 100 have multiple smaller tensor register files 110, at least some of which are used to store tensors for a specific set of one or more types of tensor operations. Each smaller tensor register file 110 may be dedicated to one instance of a tensor operation calculator 112. Such a configuration may improve bandwidth by keeping the various tensor operation calculators 112 busy a high percentage of the time. For example, having the dedicated tensor register files 110 may avoid or at least reduce stalls that could otherwise occur while a tensor operation calculator 112 waits for a tensor to be provided from storage.

Figure 8:
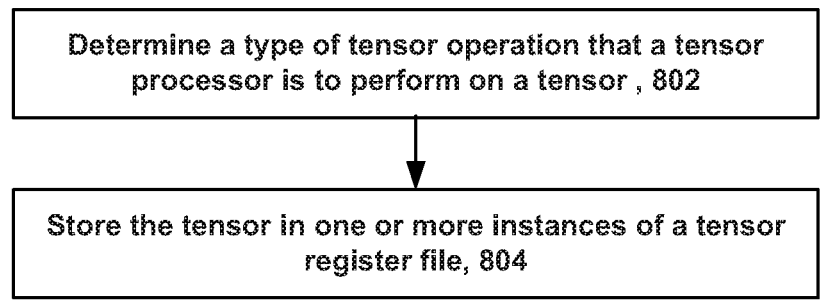
FIG. 8 is a flowchart of one embodiment of a process of storing tensors in tensor register files.

FIG. 8 is a flowchart of one embodiment of a process 800 of storing tensors in tensor register files 110. The process 800 may be implemented in a hardware accelerator 100 such as those embodiments depicted in FIGS. 1 and 2, but is not limited to those embodiments. The hardware accelerator 100 may also be referred to as a tensor processor. In one embodiment, the tensor processor has a number of tensor operation calculators 112 and a number of tensor register files 110. Each of the tensor operation calculators 112 may be configured to perform a type of tensor operation. Each of the tensor register files 110 may be associated with one of the tensor operation calculators 112. In one embodiment, each of the tensor register files 110 is dedicated to one of the tensor operation calculators 112. Each instance of a tensor operation calculator may be configured to perform a set of one or more types of vector operations. Moreover, there may be variation in functionally between the tensor operation calculators, such that different tensor operation calculators perform different sets of types of vector operations. This configuration may, in effect, result in different tensor register files 110 that are associated with different sets of one or more types of tensor operations.

Step 802 includes determining a type of tensor operation that the tensor processor is to perform on a tensor. For example, circuitry in the tensor processor may determine whether this tensor is to be used for a vector-vector multiply, a vector-vector addition, a matrix-vector multiply, a vector-vector division, etc. In one embodiment, instruction decoder 106 makes this determination based on a value of a filed in a machine instruction to store the tensor in the tensor processor.

Step 804 includes storing the tensor in one or more instances of a tensor register file 110. In one embodiment, the tensor is stored in a tensor register file associated with a tensor operation calculator that is configured to perform the type of tensor operation. For example, if the tensor is to be used for matrix-vector multiply, then the tensor may be stored in a tensor register file 110 that is associated with a tensor operation calculator 112 that is configured to perform matrix-vector multiply. In one embodiment, the tensor is stored in all instances of tensor register files 110 that are associated with a tensor operation calculator 112 that is configured to perform matrix-vector multiply.

Figure 9:
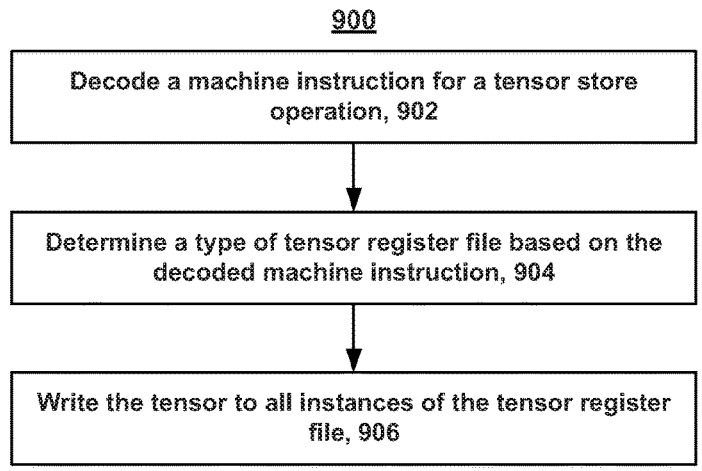
FIG. 9 is a flowchart of one embodiment of a process of storing tensors in a tensor processor in response to a machine instruction to store a tensor in a tensor processor.

In one embodiment, writing to tensor register files 110 is controlled based on machine instructions. In one embodiment, a value in a field in a machine instruction to store a tensor indicates the type of tensor register file 110 into which the tensor should be stored. FIG. 9 is a flowchart of one embodiment of a process 900 of storing tensors in a tensor processor in response to a machine instruction 302 to store a tensor in a tensor processor 100.

Step 902 includes decoding a machine instruction to store a tensor in the tensor processor. Step 902 includes accessing a value in an operand field of the machine instruction, in one embodiment.

Step 904 includes determining a type of tensor register file 110 in which to store the tensor, based on the decoded machine instruction. The value in the operand field indicates the type of tensor register file 110 into which the tensor should be loaded, in one embodiment. As noted above, in some embodiments, each tensor register file 110 is associated with a set of one or more types of tensor operations. This may be based on what tensor operator calculator 112 the tensor register file 110 is dedicated to. Moreover, the tensor register files 110 can be classified into different types, based on the types of tensor operations associated with the tensor register files 110. In one embodiment, the value in the operand field is used to select one of the types of tensor register files 110.

For example, the value may indicate whether the tensor is to be stored in a tensor register file 110 that is used to store matrices for matrix-vector multiplies, a tensor register file 110 that is used to store tensors for matrix-vector multiplies, a tensor register file 110 that is used to store tensors for vector-vector multiplies, a tensor register file 110 that is used to store vectors for vector-vector addition/subtraction, etc. Note that a tensor register file 110 may be used to store matrices for matrix-vector multiplies if it is dedicated to a tensor operator calculator 112 configured to perform matrix-vector multiplies, etc.

Step 906 includes writing the tensor to all instances of the type of tensor register file 110. For some types of tensor register files 110, there may be only one instance the tensor register file 110.

In one embodiment, reading from tensor register files 110 is controlled based on a type of tensor operation to be performed to execute a machine instruction. For example, a tensor register file 110 that stores matrices for matrix-vector multiplies might only be accessed in response to executing a machine instruction to perform a matrix-vector multiply. As another example, a tensor register file 110 that stores tensors for matrix-vector multiplies might only be accessed in response to executing a machine instruction to perform a matrix-vector multiply. As still another example, a tensor register file 110 that stores tensors for vector-vector multiplies might only be accessed in response to executing a machine instruction to perform a vector-vector multiply. As a further example, tensor register file 110 that stores tensors for vector-vector addition/subtraction might only be accessed in response to executing a machine instruction to perform a vector-vector addition/subtraction.

Figure 10:
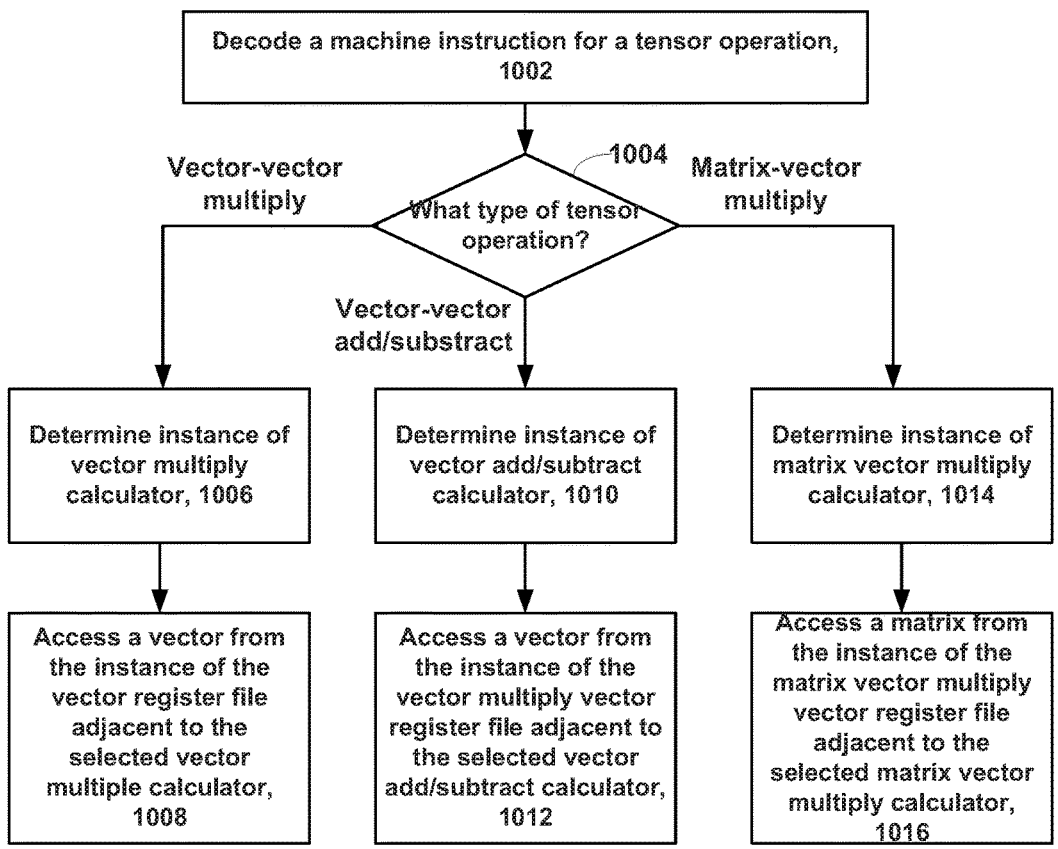
FIG. 10 is a flowchart of one embodiment of a process of accessing tensors from tensor register files in a tensor processor in which access to the tensor register files is controlled based on a type of tensor operation of a machine instruction.

In one embodiment, the hardware accelerator 100 controls access to the tensor register files 110 based on a type of tensor operation that a machine instruction is to perform when executed in one of the tensor operation calculators 112. FIG. 10 is a flowchart of one embodiment of a process 1000 of accessing tensors from tensor register files 110 in a tensor processor in which access to the tensor register files 110 is controlled based on a type of tensor operation of a machine instruction. In the examples of process 1000, three different tensor operations are considered (vector-vector multiply, vector-vector add/subtract, matrix-vector multiply). The various types of tensor operations in the process 1000 are for purpose of illustration. The process 1000 can be modified to include many other types of tensor operations, or to drop some of those depicted in FIG. 10.

In step 1002, a machine instruction is decoded. In one embodiment, the instruction decoder 106 performs step 1002. The instruction decoded 106 may determine what type of tensor instruction is to be performed based on an operation code of the machine instruction.

If the machine instruction is for a vector-vector multiply then steps 1006-1008 may be performed. In step 1006, circuitry in the tensor processor determines an instance of a vector multiply calculator that is to perform the tensor operation. For the sake of discussion, tensor operation calculator 112(2) in tensor operation component 102(2) is selected. In step 1008, a tensor is accessed from the instance of the tensor register file adjacent to the selected tensor operation calculator 112(2). Referring to FIG. 2 for example, a tensor is accessed from tensor register file 110(2) in tensor operation calculator 102(2). Note that the tensor operation calculator 112(2) may be provided with another tensor from elsewhere than tensor register file 110(2) for the other tensor for the vector-vector multiply.

If the machine instruction is for a vector-vector addition/subtraction then steps 1010-1012 may be performed. Note that in this case, steps 1010-1012 may be performed whether the tensor operation is addition or subtraction. In step 1010, circuitry in the tensor processor determines an instance of a vector addition/subtraction calculator that is to perform the tensor operation. For the sake of discussion, tensor operation calculator 112(3) in tensor operation component 102(2) is selected. In step 1012, a tensor is accessed from the instance of the tensor register file adjacent to the selected tensor operation calculator 112(3). Referring to FIG. 2 for example, a tensor is accessed from tensor register file 110(3) in tensor operation component 102(2). Note that the tensor operation calculator 112(2) may be provided with another tensor from elsewhere than tensor register file 110(2) for the other tensor for the vector-vector addition/subtraction.

Note that one of several different types of opcodes may be used to specify the vector-vector addition/subtraction. For example, one operation code may be used to specify vector-vector addition, another operation code may be used to specify vector-vector subtraction in which the tensor in tensor register file 110(3) is the minuend, another operation code may be used to specify vector-vector subtraction in which the tensor in tensor register file 110(3) is the subtrahend.

If the machine instruction is for a matrix-vector multiply then steps 1014-1016 may be performed. In step 1014, circuitry in the tensor processor determines an instance of a matrix-vector multiply calculator that is to perform the tensor operation. For the sake of discussion, tensor operation calculator 112(1) in tensor operation component 102(1) is selected. In step 1016, a tensor is accessed from the instance of the tensor register file adjacent to the selected tensor operation calculator 112(2). Referring to FIG. 2 for example, a tensor is accessed from tensor register file 110(4) in tensor operation component 102(1). As another example, a matrix is accessed from tensor register file 110(1) in tensor operation component 102(1).

Some embodiments of a hardware accelerator have a native size of tensors in a machine instruction. For example, a matrix-vector multiply may assume a 100 by 100 matrix, and a vector of 100 elements. In one embodiment, a tiling factor may be specified in one of the machine instructions to allow a tensor having other than the native size to be processed. The tiling factor may be used to adjust the number of rows and/or columns of a matrix. For example, a tiling factor of two for rows and three for columns indicates that the matrix-vector multiply instruction is to operate on a 200 by 300 matrix. Vectors may also have a native size that may be scaled by the tiling factor. For example, a vector may have a native size of 100 elements.

The tiling factor allows the tensor processor to operate more efficiently. For example, instruction throughput may be improved. Note that instruction execution rate in the tensor processor can be extremely fast. Hence, instruction decoding and issuance to the tensor operation components 102 needs to be fast to prevent a bottleneck. The tiling factor helps to keep instruction decoding/issuance from falling behind instruction execution. Additionally, the tiling factor may simplify the code (e.g., the chain of machine instructions).

The following two code snippets show how one embodiment of a tiling factor may be used to use significantly fewer machine instructions.

TABLE I

| 1. | for (int r = 0; r < rows; r++) { |
| 2. | for (int c = 0; c < cols; c++) { |
| 3. | v_rd(InitialVRF, v1 + c); |
| 4. | mv_mul(m1 + cols * r + c); |
| 5. | if (c != 0) w_add(v2); |
| 6. | if (c != cols−1) v_wr(AddSubVRF, v2); |
| 7. | } |
| 8. | vv_add(v3 + r); |
| 9. | v_sigmO; |
| 10. | v_wr(NetOutputQ, v4 + r); |
| 11. | } |

TABLE II

| 1. | setLogicalRowsCols(rows, cols) |
| 2. | v_rd(InitialVRF, v1); |
| 3. | mv_mul(m1); |
| 4. | w_add(v3); |
| 5. | v_sigmO; |
| 6. | v_wr(NetOutputQ, v4); |

Figure 11:
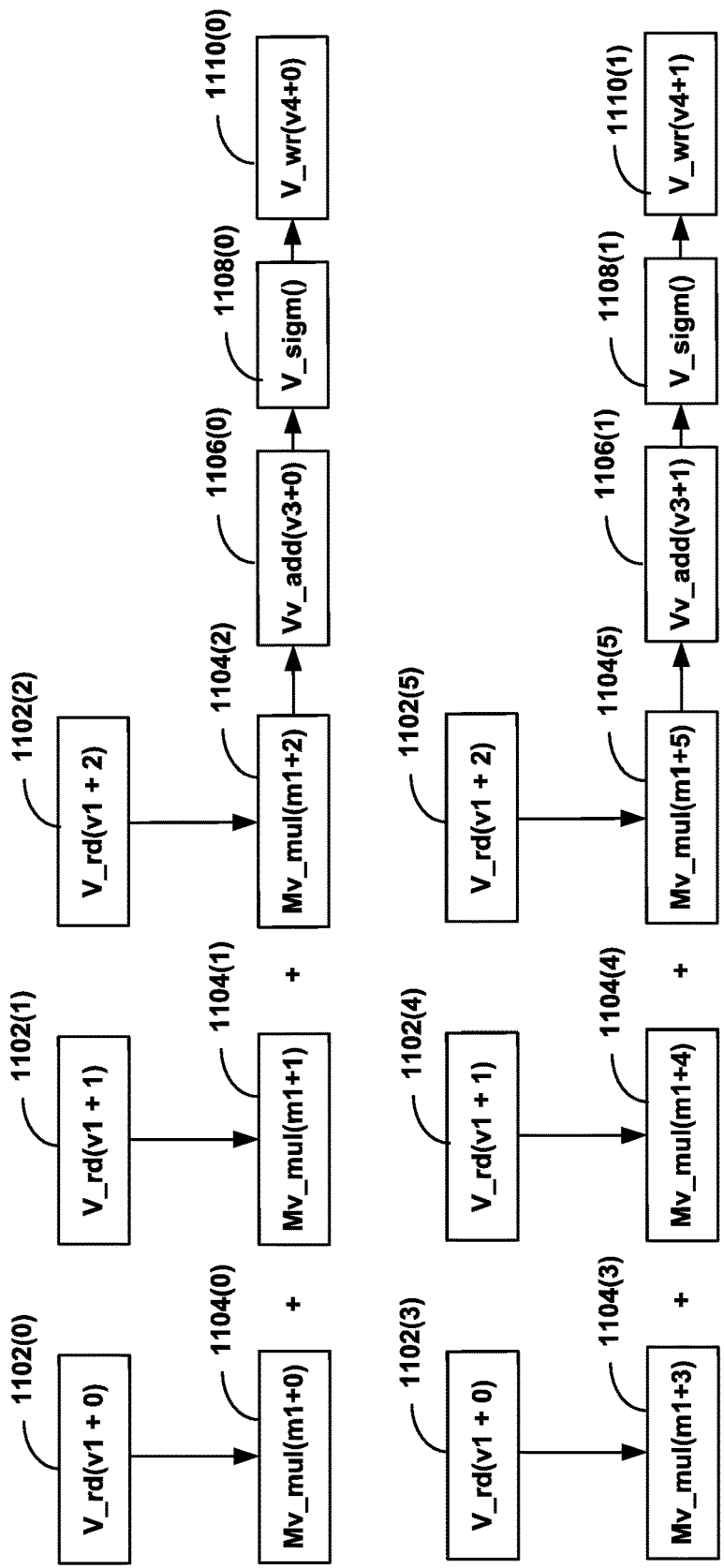
FIG. 11 is a diagram that illustrates functionality that may be achieved by executing the code in Table II in one embodiment of a hardware accelerator.

The code snippet in each table may perform the same functionality, but the code in the Table II has fewer instructions. The tiling factor may be set by "setLogicalRowsCols". FIG. 11 is a diagram that illustrates functionality that may be achieved by executing the code in Table II in one embodiment of a hardware accelerator 100. The tiling factor has been set to two rows and three columns in the example of FIG. 11. When discussing FIG. 11, reference will be made to various elements in FIG. 2 for sake of illustration.

Referring to FIG. 11, machine instruction "v_rd(InitialVRF, v1)" may be executed multiple times (1102(0)-1102(5)) across three different addresses (v1+0, v1+1, v1+2). Each address includes a base address (e.g., "v1") and an offset. The offset may be based on the native tensor size. This instruction reads in tensors to a tensor register file 110 such as tensor register file 110(4) in tensor operation component 102(1). Note that the native size of a tensor in which all of the elements are scalar elements might be 100 scalar elements, as one example. Thus, the net result is that the tensor to be loaded has 300 scalar elements, as one example.

Machine instruction "mv_mul(m1)" may be executed six times (1104(0)-1104(5)) across six different addresses (m1+0, m1+1, m1+2, m1+3, m1+4, m1+5). This instruction performs matrix-vector multiplies in, for example, tensor operation calculator 112(1). The matrices are identified based on offsets from the address "m1" in this instruction. The tensors for the matrix-vector multiplies are the ones loaded by the previous v_rd(InitialVRF, v1) instruction.

Machine instruction "W_add(v3)" is executed across two addresses (v 3+0, v 3+1). These addresses are based on offsets from the "v3" in this instruction. Thus, in effect, two unique vectors of the "native size" are specified. This instruction performs vector addition in, for example, tensor operation calculator 112(3) in tensor operation component 102(2). The vectors specified by v3+0, v3+1 may come from tensor register file 110(3), for example. The other vectors for the addition may be resultant tensors from the matrix-vector multiply.

Machine instruction "v_sigm( )" may be executed twice (1108(0), 1108(1)). This may take the sigmoid of each element in the resultant tensors of the vector-vector addition. The result of this instruction may be stored in two "native size" vectors in a tensor register file 110.

Machine instruction "v_wr(NetOutoutQ, v4)" may be executed twice (1110(0), 1110(1)) across two addresses (v4+0, v4+1). This instruction may transfer two "native size" vectors from the tensor register file 110 holding the result of the sigmoid into the output queue 222.

In one embodiment, the tiling factor is used on a chain by chain basis. FIG. 12 is a flowchart of one embodiment of a process 1200 of executing a chain of machine instructions in a tensor processor based on a tiling factor. Step 1202 includes a determination of whether a new chain has started. Step 1202 may be similar to step 352 in FIG. 3B.

Step 1204 is a determination of whether a tiling factor has been specified for this chain. In one embodiment, the tiling factor is specified by an instruction in the chain.

If there is not a tiling factor, then the next instruction is the chain is executed using a native size of tensors in the tensor processor 100, in step 1206. The tensor processor continues to execute additional instructions until an end of the chain is detected, in step 1208. The end of the chain may be detected as in step 358 of FIG. 3B.

If there is a tiling factor, then the next instruction is the chain is executed while scaling the native size of tensors in the tensor processor, in step 1210. The tensor processor continues to execute additional instructions until an end of the chain is detected, in step 1212.

Figure 13:
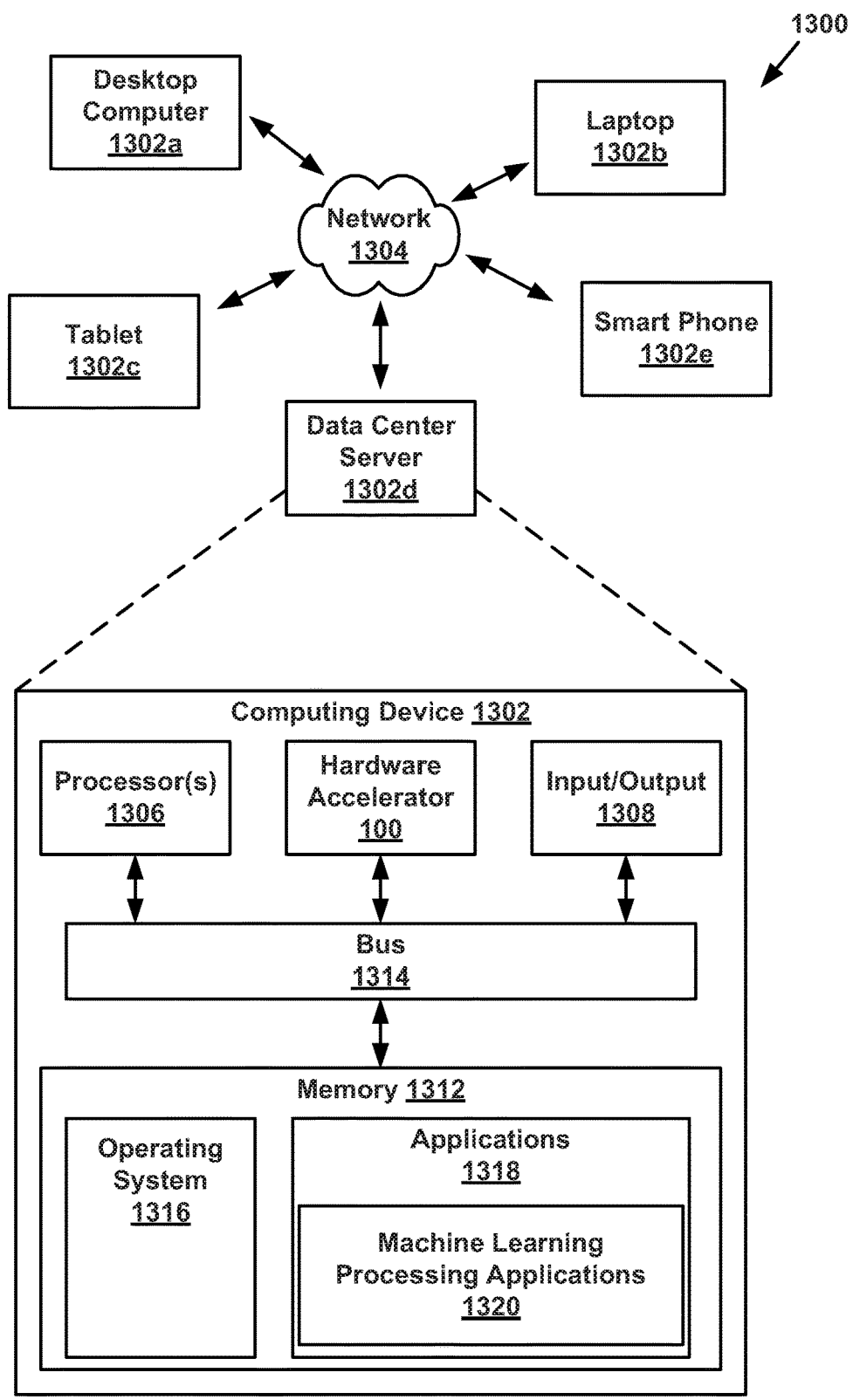
FIG. 13 illustrates an example environment in which an embodiment of a hardware accelerator as described herein can operate.

FIG. 13 illustrates an example environment 1300 in which an embodiment of a hardware accelerator 100 as described herein can operate. In some embodiments, the example environment 1300 can be used to execute machine learning algorithms, such as deep neural networks. In some examples, the various devices and/or components of environment 1300 include a variety of computing devices 1302. By way of example and not limitation, computing devices 1302 may include devices 1302a-1302e. Although illustrated as a diverse variety of device types, computing devices 1302 can be other device types and are not limited to the illustrated device types. In some implementations any of a number of computing devices 1302 may be interconnected via a network 1304.

Network 1304 can include, but is not limited to, a cellular network (e.g., wireless phone), a point-to-point dial up connection, a satellite network, the Internet, a local area network, a wide area network, a WiFi network, an ad hoc network, an intranet, an extranet, or a combination thereof. Network 1304 may include one or more connected networks (e.g., a multi-network environment). Network 1304 may include one or more data centers that store and/or process information (e.g., data) received from and/or transmitted to computing devices 1302.

In an implementation, computing devices 1302 can include any type of device with one or multiple processors 1306 operably connected to an input/output interface 1308, a hardware accelerator 100, and a memory 1312, e.g., via a bus 1314. Computing devices 1302 can include personal computers such as, for example, desktop computers 1302a, laptop computers 1302b, tablet computers 1302c, data center servers 1302d (or servers is any other environment), smart phones 1302e, electronic book readers, wearable computers, automotive computers, gaming devices, etc. In an implementation, computing devices 1302 need not include processor 1306, and may be a hardware appliance.

Computing devices 1302 also can include other computing devices such as, for example, server computers, thin clients, terminals, and/or work stations. In some examples, computing devices 1302 can include, for example, components for integration in a computing device, appliances, or other sorts of devices.

In some examples, some or all of the functionality described as being performed by computing devices 1302 may be implemented by one or more remote peer computing devices, a remote server or servers, or a cloud computing resource. In some examples, a computing device 1302 may include an input port to receive an input data sequence. Computing device 1302 may further include one or multiple processors 1306 to perform machine learning processing, for example.

In some examples, as shown regarding device 1302d, memory 1312 can store instructions executable by the processor(s) 1306 including an operating system 1316, and programs or applications 1320 that are loadable and executable by processor(s) 1306. Applications 1320 may include machine learning processing applications 1320 that may be executed to operate hardware accelerator 100, for example. The one or more processors 1306 may include one or more central processing units (CPUs), graphics processing units (GPUs), video buffer processors, and so on.

In some implementations, machine learning processing applications 1320 include executable code stored in memory 1312 and executable by processor(s) 1306 to receive and implement machine learning algorithms that include data sequences (e.g., streaming data or data files), locally or remotely by computing device 1302, via input/output 1308.

In some examples, the data sequences may be associated with one or more applications 1320. Machine learning processing applications 1320 may operate in combination with hardware accelerator 100 to apply any of a number of processes used to process data stored in memory 1312 or received via input/output 1308.

Although certain blocks have been described as performing various operations, the modules are merely examples and the same or similar functionality may be performed by a greater or lesser number of modules. Moreover, the functions performed by the modules depicted need not necessarily be performed locally by a single device. Rather, some operations could be performed by a remote device (e.g., peer, server, cloud, etc.).

Alternatively, or in addition, some or all of the functionality described herein can be performed, at least in part, by one or more hardware logic circuits. For example, and without limitation, illustrative types of hardware logic circuits that can be used include an FPGA device, an application-specific integrated circuit (ASIC) device, a GPU, a massively parallel processor array (MPPA) device, an application-specific standard product (ASSP) device, a system-on-a-chip device (SOC) device, a complex programmable logic device (CPLD), a custom integrated circuit, etc.

Computer readable media may include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media embodies computer readable instructions, data structures, program modules, or other data in a modulated data signal, such as a carrier wave, or other transmission mechanism. As defined herein, computer storage media does not include communication media. In various examples, memory 1312 is an example of computer storage media storing computer-executable instructions.

In various examples, an input device of input/output interface 1308 can be a direct-touch input device (e.g., a touch screen), an indirect-touch device (e.g., a touch pad), an indirect input device (e.g., a mouse, keyboard, a camera or camera array, etc.), or another type of non-tactile device, such as an audio input device.

Computing device(s) 1302 also may include one or more input/output interfaces 1308 to allow computing device 1302 to communicate with other devices. Input/output interface 1308 can include one or more network interfaces to enable communications between computing device 1302 and other networked devices such as other device(s) 1302. Input/output interface 1308 can allow a computing device 1302 to communicate with other devices such as user input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like).

One embodiment includes a method of operating a tensor processor having a plurality of tensor operation calculators each configured to perform a type of tensor operation and plurality of tensor register files. Each of the tensor register files is dedicated to one of the plurality of tensor operation calculators. The method comprises: determining a type of tensor operation that the tensor processor is to perform on respective ones of a plurality of tensors; and storing each respective tensor of the plurality of tensors in a tensor register file dedicated to a tensor operation calculator that is configured to perform the type of tensor operation the tensor processor is to perform on the respective tensor.

One embodiment includes a tensor processor, comprising a plurality of tensor operation calculators each configured to perform a type of tensor operation from a plurality of types of tensor operations and a plurality of tensor register files. Each of the tensor register files is dedicated to one of the plurality of tensor operation calculators. The tensor processor further comprises circuitry configured to determine a type of tensor operation that the tensor processor is to perform on respective ones of a plurality of tensors. The tensor processor further comprises circuitry configured to store each respective tensor in a tensor register file dedicated to a tensor operation calculator that is configured to perform the type of tensor operation the tensor processor is to perform on the respective tensor.

One embodiment includes a method of executing machine instructions in a tensor processor. The method comprises accessing a first machine instruction in a chain of machine instructions, and accessing a second machine instruction in the chain of machine instructions. The second machine instruction is missing a tensor operand needed to execute the second machine instruction. The method also comprises executing the first machine instruction in the tensor processor to result in a resultant tensor. The method also comprises executing the second machine instruction in the tensor processor using the resultant tensor as the missing tensor operand.

One embodiment includes a tensor processor comprising: circuitry configured to decode a subject machine instruction in a chain of machine instructions; circuitry configured to determine that the subject machine instruction is missing a tensor operand needed to execute the subject machine instruction; circuitry configured to identify another machine instruction in the chain that is to provide the missing tensor operand; circuitry configured to execute the other machine instruction to result in a resultant tensor; and circuitry configured to execute the subject machine instruction using the resultant tensor as the missing tensor operand.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. An apparatus comprising:
   a first tensor operation calculator that is configured to execute a first tensor operation;
   a second, different tensor operation calculator that is configured to execute a second tensor operation differing from the first tensor operation; and logic configured to:
  access a first machine instruction in a set of machine instructions;
  access a second machine instruction in the set of machine instructions, wherein the second machine instruction is missing a tensor operand needed to execute the second machine instruction;
  execute the first machine instruction in the first tensor operation calculator, resulting in a tensor;
  route, based on the second machine instruction having the missing tensor operand, the resultant tensor from the first tensor operation calculator to the second tensor operation calculator for use as the missing tensor operand; and
  execute the second machine instruction using the resultant tensor as the missing tensor operand.

2. The apparatus of claim 1, wherein the logic is configured to use a resultant tensor of executing the second machine instruction to execute a third machine instruction immediately following the second machine instruction in response to the third machine instruction missing a tensor operand needed to execute the third machine instruction.

3. The apparatus of claim 1,
  wherein the second machine instruction is for a tensor operation between at least a first tensor and a second tensor, wherein the second machine instruction at least partially specifies the second tensor but does not specify the first tensor;
  wherein the logic is configured to route the resultant tensor from executing the first machine instruction in the first tensor operation calculator to the second tensor operation calculator for use as the first tensor and to use the tensor at least partially specified in the second machine instruction as the second tensor.

4. The apparatus of claim 1, wherein the logic is further configured to:
  access a third machine instruction in the set of machine instructions, wherein the third machine instruction is at an end of the set and instructs to store a tensor to memory but does not specify the tensor; and
  store to memory a final tensor, resulting from the executing the second machine instruction, as the unspecified tensor.

5. The apparatus of claim 1, wherein the logic is further configured to:
  access a third machine instruction, the third machine instruction being for a first type of tensor operation, of a plurality of types of tensor operations, wherein the third machine instruction does not specify a first tensor operand and only partially specifies a second tensor; and
  access a tensor register file that is implied by the first type of tensor operation in order to access the second tensor operand.

6. The apparatus of claim 1, wherein the logic is further configured to:
  decode the second machine instruction to determine a type of tensor operation instructed by the second machine instruction and an index;
  select the second tensor operation calculator to perform the type of tensor operation instructed by the second machine instruction; and
  based on the index, provide a tensor from a tensor register file that is dedicated to the second tensor operation calculator as a tensor input for executing the second machine instruction.

7. The apparatus of claim 1, wherein the logic is configured to:
  alter a native size of tensor operations executed in the apparatus based on a tiling factor associated with the set of machine instructions.

8. A method of executing machine instructions in a tensor processor, comprising:
  accessing a first machine instruction in a chain of machine instructions;
  accessing a second machine instruction in the chain of machine instructions, wherein the second machine instruction is missing a tensor operand needed to execute the second machine instruction;
  executing the first machine instruction by a first tensor operation calculator in the tensor processor to result in a resultant tensor
  routing the resultant tensor from the first tensor operation calculator to a second tensor operation calculator in the tensor processor for use as the missing tensor operand without intermediate storage of the resultant tensor; and
  executing the second machine instruction by the second tensor operation calculator in the tensor processor using the resultant tensor as the missing tensor operand.

9. The method of claim 8, further comprising using logic in the tensor processor, to select, by default, a resultant tensor, from executing one machine instruction in the chain, as an input tensor to execute the next machine instruction in the chain.

10. The method of claim 8, further comprising:
  executing the second machine instruction by the second tensor operation calculator using a tensor at least partially specified in the second machine instruction as a first tensor and the resultant tensor as a second tensor in a tensor operation.

11. The method of claim 8, wherein executing the first machine instruction by the first tensor operation calculator in the tensor processor to result in the resultant tensor comprises loading an initial tensor into a tensor register file in the tensor processor.

12. The method of claim 11, further comprising:
  routing the tensor from the tensor register file to the second tensor operation calculator in the tensor processor for use as the missing tensor operand without intermediate storage of the resultant tensor.

13. The method of claim 8, further comprising:
  storing a final tensor, resulting from the execution of the second machine instruction, to memory external to the tensor processor.

14. The method of claim 8, further comprising:
  altering a native size of tensor operations in the tensor processor based on a tiling factor specified in the chain of machine instructions.

15. An apparatus comprising:
  a tensor register file;
  a tensor operation calculator that is configured to execute a tensor operation; and
  logic configured to:
    access a first machine instruction in a set of machine instructions, the first machine instruction being an instruction to load an initial tensor at a start of the set of machine instructions;
    access a second machine instruction in the set of machine instructions, wherein the second machine instruction is missing a tensor operand needed to execute the second machine instruction;
    execute the first machine instruction to load the initial tensor into the tensor register file;

route the initial tensor from the tensor register file to the tensor operation calculator for use as the missing tensor operand without intermediate storage of the initial tensor; and execute the second machine instruction using the initial tensor as the missing tensor operand.

16. The apparatus of claim 15, wherein the logic is configured to use a resultant tensor of executing the second machine instruction to execute a third machine instruction immediately following the second machine instruction in response to the third machine instruction missing a tensor operand needed to execute the third machine instruction.

17. The apparatus of claim 15, wherein the logic is further configured to:

access a third machine instruction in the set of machine instructions, wherein the third machine instruction is at an end of the set and instructs to store a tensor to memory but does not specify the tensor; and store to memory a final tensor, resulting from the executing the second machine instruction, as the unspecified tensor.

18. The apparatus of claim 15, wherein the logic is further configured to:

access a third machine instruction, the third machine instruction being for a first type of tensor operation, of a plurality of types of tensor operations, wherein the third machine instruction does not specify a first tensor operand and only partially specifies a second tensor; and access a tensor register file that is implied by the first type of tensor operation in order to access the second tensor operand.

19. The apparatus of claim 15, wherein the logic is further configured to:

decode the second machine instruction to determine a type of tensor operation instructed by the second machine instruction and an index;

select the second tensor operation calculator to perform the type of tensor operation instructed by the second machine instruction; and based on the index, provide a tensor from a tensor register file that is dedicated to the second tensor operation calculator as a tensor input for executing the second machine instruction.

20. The apparatus of claim 15, wherein the logic is configured to:

alter a native size of tensor operations executed in the apparatus based on a tiling factor associated with the set of machine instructions.

* * * * *